US012625585B2

(12) United States Patent
Na et al.

(10) Patent No.: US 12,625,585 B2
(45) Date of Patent: May 12, 2026

(54) ELECTRONIC APPARATUS

(71) Applicant: Samsung Display Co., LTD., Yongin-si (KR)

(72) Inventors: Hyunjae Na, Yongin-si (KR); Seokwon Jang, Yongin-si (KR); Hirotsugu Kishimoto, Yongin-si (KR); Chul Ho Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/411,234

(22) Filed: Jan. 12, 2024

(65) Prior Publication Data

US 2024/0319828 A1     Sep. 26, 2024

(30) Foreign Application Priority Data

Mar. 24, 2023     (KR) ........................ 10-2023-0038348

(51) Int. Cl.
    *G06F 3/044*     (2006.01)
    *G06F 1/16*     (2006.01)
    *G06F 3/046*     (2006.01)

(52) U.S. Cl.
    CPC ............ *G06F 3/044* (2013.01); *G06F 1/1641* (2013.01); *G06F 1/1643* (2013.01); *G06F 1/1652* (2013.01); *G06F 3/046* (2013.01)

(58) Field of Classification Search
None
See application file for complete search history.

(56) References Cited

U.S. PATENT DOCUMENTS

| | | | |
|---|---|---|---|
| 10,976,873 B2 | 4/2021 | Shin et al. | |
| 11,216,139 B2 * | 1/2022 | Lee ........................ | G06F 3/0412 |
| 12,079,039 B2 * | 9/2024 | Kishimoto ............ | G06F 1/1616 |
| 2014/0139447 A1 * | 5/2014 | Kang .................... | G06F 3/0443 |
| | | | 345/173 |
| 2018/0089485 A1 * | 3/2018 | Bok ........................ | G06F 1/1684 |
| 2018/0120997 A1 * | 5/2018 | Moon ................. | G06F 3/04164 |

(Continued)

FOREIGN PATENT DOCUMENTS

| | | | | |
|---|---|---|---|---|
| CN | 110221730 A * | 9/2019 | .......... | G06F 3/0412 |
| EP | 4354251 A1 * | 4/2024 | .......... | G06F 1/1641 |

(Continued)

*Primary Examiner* — Patrick N Edouard
*Assistant Examiner* — Peijie Shen
(74) *Attorney, Agent, or Firm* — CANTOR COLBURN LLP

(57) ABSTRACT

An electronic apparatus includes a display module and a digitizer, in which first and second non-folding parts are arranged in a first direction, and a folding part foldable along a folding axis and between the first non-folding part and the second non-folding part are defined. The digitizer includes sensing coils on the first non-folding part and the second non-folding part and connection lines on the folding part and connected to the sensing coils. The folding part includes a central portion overlapping the active area and provided with first holes, and an outer portion overlapping the peripheral area and provided with second holes and third holes. Each of the second holes has a shape different from a shape of each of the first holes, and each of the third holes has a shape different from the shape of each of the first holes and the shape of the second holes.

30 Claims, 28 Drawing Sheets

(56)  References Cited

U.S. PATENT DOCUMENTS

| | | | |
|---|---|---|---|
| 2018/0122554 A1* | 5/2018 | Ryu | H01F 27/2804 |
| 2019/0064958 A1* | 2/2019 | Liu | G06F 3/0443 |
| 2021/0072865 A1* | 3/2021 | He | G06F 3/0443 |
| 2021/0295006 A1* | 9/2021 | Ryu | G06F 3/0445 |
| 2021/0333944 A1* | 10/2021 | Jung | H10K 59/40 |
| 2021/0397221 A1* | 12/2021 | Hwang | G06F 3/0416 |
| 2022/0061169 A1* | 2/2022 | Shin | G06F 1/1641 |
| 2022/0075416 A1* | 3/2022 | Kishimoto | G06F 3/0412 |
| 2022/0091632 A1* | 3/2022 | Hong | H10K 59/40 |
| 2022/0100234 A1* | 3/2022 | Kishimoto | G06F 3/0446 |
| 2022/0147102 A1* | 5/2022 | Kishimoto | G06F 1/1656 |
| 2022/0174823 A1* | 6/2022 | Kim | H04M 1/0216 |
| 2022/0357816 A1* | 11/2022 | Wen | G09G 3/035 |
| 2022/0397969 A1* | 12/2022 | Sim | H10K 77/111 |
| 2023/0114397 A1* | 4/2023 | Kishimoto | B32B 15/14 |
| | | | 361/807 |
| 2023/0229194 A1* | 7/2023 | Kishimoto | G06F 1/1681 |
| | | | 361/679.01 |
| 2023/0236629 A1* | 7/2023 | Kishimoto | G06F 1/1652 |
| | | | 361/679.02 |
| 2023/0244271 A1* | 8/2023 | Shin | H04M 1/0216 |
| | | | 361/679.27 |
| 2023/0289021 A1* | 9/2023 | Jeon | G06F 3/046 |
| 2024/0085998 A1* | 3/2024 | Yoon | H10K 59/40 |
| 2024/0143097 A1* | 5/2024 | Kishimoto | G06F 3/046 |
| 2024/0152183 A1* | 5/2024 | Kishimoto | G06F 1/1616 |
| 2024/0152222 A1* | 5/2024 | Kishimoto | G06F 3/046 |
| 2024/0160246 A1* | 5/2024 | Na | G06F 1/1652 |
| 2024/0160328 A1* | 5/2024 | Gu | H04M 1/0268 |
| 2024/0160329 A1* | 5/2024 | Na | G06F 1/1652 |
| 2024/0163355 A1* | 5/2024 | Jang | G06F 1/1643 |
| 2024/0164035 A1* | 5/2024 | La | H05K 5/0018 |
| 2024/0184332 A1* | 6/2024 | Kim | G06F 3/0446 |
| 2024/0220061 A1* | 7/2024 | Kishimoto | G06F 3/046 |
| 2024/0281034 A1* | 8/2024 | Jang | G06F 1/1616 |
| 2024/0302863 A1* | 9/2024 | Jang | G06F 3/046 |
| 2024/0319836 A1* | 9/2024 | Jang | G06F 1/1616 |

FOREIGN PATENT DOCUMENTS

| | | |
|---|---|---|
| KR | 101687158 B1 | 12/2016 |
| KR | 1020200084495 A | 7/2020 |

* cited by examiner

ELECTRONIC APPARATUS

This application claims priority to Korean Patent Application No. 10-2023-0038348, filed on Mar. 24, 2023, and all the benefits accruing therefrom under 35 U.S.C. § 119, the content of which in its entirety is herein incorporated by reference.

BACKGROUND

1. Field

The present disclosure herein relates to an electronic apparatus including a digitizer, and more particularly, to an electronic apparatus including a digitizer having improved sensing performance in a folding part.

2. Description of the Related Art

In the information society, electronic apparatuses are becoming increasingly important as a medium for delivering visual information. Such an electronic apparatus may receive an electrical signal to be activated. The electronic apparatus may include a digitizer that senses an input applied from the outside of a display layer displaying an image.

The digitizer may include various sensing coils to be activated by an electrical signal. An area, on which the sensing coils are activated, may respond to a signal applied from the outside.

SUMMARY

The disclosure provides an electronic apparatus including a digitizer having improved sensing performance in the folding part.

An embodiment of the invention provides an electronic apparatus including: a display module including an active area, on which an image is displayed, and a peripheral area adjacent to the active area; and a digitizer disposed below the display module, where a first non-folding part and a second non-folding part, which are arranged in a first direction, and a folding part foldable along a folding axis extending in a second direction crossing the first direction and disposed between the first non-folding part and the second non-folding part are defined in the digitizer, and the digitizer includes sensing coils disposed in the first non-folding part and the second non-folding part and connection lines disposed in the folding part and connected to the sensing coils, where the folding part includes: a central portion overlapping the active area and provided with first holes defined therethrough; and an outer portion overlapping the peripheral area and provided with second holes defined therethrough and third holes defined therethrough, where each of the second holes has a shape different from a shape of each of the first holes, and each of the third holes has a shape different from the shape of each of the first holes and the shape of the second holes.

In an embodiment, the sensing coils may include first sensing coils and second sensing coils which are insulated from each other and each of which defines an open loop, and the digitizer may further include: a base layer which includes a top surface facing the display module and a bottom surface opposing the top surface and on which the first sensing coils and the second sensing coils are disposed: a first upper base layer disposed on the top surface of the base layer: a second upper base layer disposed on a top surface of the first upper base layer: a first lower base layer disposed on the bottom surface of the base layer; and a second lower base layer disposed on a bottom surface of the first lower base layer.

In an embodiment, the first holes may include first group holes extending in the second direction and arranged in the second direction, and second group holes alternately arranged with the first group holes, shifted with respect to the first group holes in the second direction, extending in the second direction, and arranged in the second direction, each of the second holes may include a first portion aligned with a corresponding one of the first group holes in the second direction and second and third portions spaced apart from each other in the first direction with the corresponding one of the first group holes therebetween and connected to the first portion, and each of the third holes may be aligned with a corresponding one of the second group holes in the second direction and arranged on an edge of the outer portion in the first direction to define an opened opening.

In an embodiment, the connection lines may include: first upper lines disposed on the base layer: second upper lines disposed on the first upper base layer; first lower lines disposed below the base layer; and second lower lines disposed below the first lower base layer, where four coils may be disposed between a second hole and a third hole, which are spaced apart from each other in the first direction, among the connection lines crossing the outer portion.

In an embodiment, the first upper lines and the first lower lines may have shapes corresponding to each other in a plan view.

In an embodiment, the second upper lines may include: a first line including a first portion which surround 'a' first portions adjacent to a boundary between the second non-folding part and the folding part and a first second portion connected to the first portion and disposed between the first group hole and the second group hole, which are adjacent to each other in the first direction: a second line including a second first portion which surround 'b' first portions adjacent to the boundary between the second non-folding part and the folding part and a second second portion connected to the second first portion, spaced apart from the first second portion in the first direction, and disposed between the first group hole and the second group hole, which are adjacent to each other in the first direction: a third line including a third first portion which surround 'c' first portions adjacent to the boundary between the second non-folding part and the folding part and a third second portion connected to the third first portion, spaced apart from the second portion in the first direction, and disposed between the first group hole and the second group hole, which are adjacent to each other in the first direction; and a fourth line including a fourth first portion which surround 'd' first portions adjacent to the boundary between the second non-folding part and the folding part and a fourth second portion connected to the fourth first portion, spaced apart from the third second portion in the first direction, and disposed between the first group hole and the second group hole, which are adjacent to each other in the first direction, where 'a', 'b', 'c', and 'd' may be natural numbers, 'a' may be less than 'b', 'b' may be less than 'c', and 'c' may be less than 'd'.

In an embodiment, the second lower lines may include: a fifth line including a fifth first portion which surround 'e' first portions adjacent to a boundary between the first non-folding part and the folding part and a fifth second portion connected to the fifth first portion and disposed between the first group hole and the second group hole, which are adjacent to each other in the first direction; a sixth line including a sixth first portion which surround 'f' first portions adjacent to the boundary between the first non-folding part and the folding part and a sixth second portion connected to the sixth first portion, spaced apart from the fifth second portion in the first direction, and disposed between the first group hole and the second group hole, which are adjacent to each other in the first direction; a seventh line including a seventh first portion which surround 'g' first portions adjacent to the boundary between the first non-folding part and the folding part and a seventh second portion connected to the seventh first portion, spaced apart from the sixth second portion in the first direction, and disposed between the first group hole and the second group hole, which are adjacent to each other in the first direction; and an eighth line including an eighth first portion which surround 'h' first portions adjacent to the boundary between the first non-folding part and the folding part and an eighth second portion connected to the eighth first portion, spaced apart from the seventh second portion in the first direction, and disposed between the first group hole and the second group hole, which are adjacent to each other in the first direction, where 'e', 'f', 'g', and 'h' may be natural numbers, 'e' may be less than 'f', 'f' may be less than 'g', and 'g' may be less than 'h'.

In an embodiment, on the plane, the first second portion, the second second portion, the third second portion, and the fourth second portion of the second upper lines may be alternately arranged with the fifth second portion, the sixth second portion, the seventh second portion, and the eighth second portion of the second lower lines in the first direction.

In an embodiment, a pitch of a second hole and a third hole, which are adjacent to each other in the first direction, may be greater than or equal to about 1.5 millimeters (mm) and less than or equal to about 2 mm, a distance between adjacent first portions of the first portions, which are aligned with the third hole in the second direction, in the first direction may be greater than or equal to about 0.5 mm and less than or equal to about 0.7 mm, a width of the first portion in the first direction may be greater than or equal to about 0.4 mm and less than or equal to about 0.6 mm, and a width of the third hole in the second direction may be greater than or equal to about 2 mm and less than or equal to about 3 mm.

In an embodiment, a line width of each of the connection lines may be greater than or equal to about 0.02 mm and less than or equal to about 0.05 mm, and a distance between adjacent connection lines among the connection lines may be greater than or equal to about 0.02 mm and less than or equal to about 0.05 mm.

In an embodiment, a width of the outer portion in the second direction may be greater than or equal to about 2 mm and less than or equal to about 5 mm.

In an embodiment, the first holes may include first group holes extending in the second direction and arranged in the second direction, and second group holes alternately arranged with the first group holes, shifted with respect to the first group holes in the second direction, extending in the second direction and arranged in the second direction, each of the second holes may be aligned with the first group holes in the second direction and arranged on an edge of the outer portion to define an opened opening, each of the third holes are alternately arranged with the second holes in the first direction and aligned with the second group holes in the second direction, and a portion of each of the first group holes aligned with the second holes in the second direction may be disposed on the outer portion.

In an embodiment, the connection lines may include: first upper lines disposed on the base layer: second upper lines disposed on the first upper base layer; first lower lines disposed below the base layer; and second lower lines disposed below the first lower base layer, where each of the first upper lines, the second upper lines, the first lower lines, and the second lower lines may include: lower connection lines which surrounds an upper end of each of the first holes and a lower end of each of the third holes, which are disposed on the outer portion, among the first holes; and upper connection lines which crosses the upper end of each of the second holes and the third holes.

In an embodiment, the second upper lines and the second lower lines may have shapes corresponding to each other in a plan view.

In an embodiment, the lower connection lines of the first upper lines may include: a first lower line including a first portion which surround the lower end of each of 'a' third holes adjacent to a boundary between the second non-folding part and the folding part and a first second portion connected to the first portion and disposed between the first group hole and the second group hole, which are adjacent to each other in the first direction; and a second lower line including a second first portion which surround the lower end of each of 'b' third holes adjacent to the boundary between the second non-folding part and the folding part and a second second portion connected to the second first portion, spaced apart from the first second portion in the first direction, and disposed between the first group hole and the second group hole, which are adjacent to each other in the first direction, where 'a' and 'b' may be natural numbers, and 'a' may be less than 'b'.

In an embodiment, the upper connection lines of the first upper lines may include: a first upper line including a third first portion which surround the upper end of each of the 'a' third holes adjacent to the boundary between the second non-folding part and the folding part and a third second portion connected to the third first portion, spaced apart from the second portion in the first direction, and disposed between the first group hole and the second group hole, which are adjacent to each other in the first direction; and a second upper line including a fourth first portion which surround the upper end of each of the 'b' third holes adjacent to the boundary between the second non-folding part and the folding part and a fourth second portion connected to the fourth first portion, spaced apart from the third second portion in the first direction, and disposed between the first group hole and the second group hole, which are adjacent to each other in the first direction.

In an embodiment, the lower connection lines of the first upper lines may include: a third lower line including a third first portion which surround the upper end of each of 'c' third holes adjacent to a boundary between the first non-folding part and the folding part and a third second portion connected to the third first portion and disposed between the first group hole and the second group hole, which are adjacent to each other in the first direction; and a fourth lower line including a fourth first portion which surround the upper end of each of 'd' third holes adjacent to the boundary between the first non-folding part and the folding part and a fourth second portion connected to the fourth first portion, spaced apart from the third second portion in the first direction, and disposed between the first group hole and the second group hole, which are adjacent to each other in the first direction, where 'c' and 'd' may be natural numbers, and 'c' may be less than 'd'.

In an embodiment, the upper connection lines of the first lower lines may include: a third upper line including a fifth first portion which surround the lower end of each of the 'c' third holes adjacent to the boundary between the first non-folding part and the folding part and a fifth second portion connected to the fifth first portion, spaced apart from the fourth second portion in the first direction, and disposed between the first group hole and the second group hole, which are adjacent to each other in the first direction; and a fourth upper line including a sixth first portion which surround the upper end of each of the 'd' third holes adjacent to the boundary between the first non-folding part and the folding part and a sixth second portion connected to the sixth first portion, spaced apart from the fifth second portion in the first direction, and disposed between the first group hole and the second group hole, which are adjacent to each other in the first direction.

In an embodiment, a pitch of the third holes in the first direction may be greater than or equal to about 0.6 mm and less than or equal to about 1.0 mm, a width of each of the third holes in the first direction may be greater than or equal to about 0.1 mm and less than or equal to about 0.2 mm, and a width of each of the third holes in the second direction may be greater than or equal to about 1.6 mm and less than or equal to about 2.5 mm.

In an embodiment, a distance between the first group hole and the third group hole, which are disposed on the outer portion in the first direction, may be greater than or equal to about 0.15 mm and less than or equal to about 0.3 mm, and a distance between the first group hole and the second group hole, which are disposed on the outer portion in the second direction, may be greater than or equal to about 0.3 mm and less than or equal to about 0.5 mm.

In an embodiment, each of the base layer, the first upper base layer, the second upper base layer, the first lower base layer, and the second lower base layer may include a reinforced fiber composite material.

In an embodiment, the base layer may include polyimide (PI), and each of the base layer, the first upper base layer, the second upper base layer, the first lower base layer, and the second lower base layer may include a reinforced fiber composite material.

In an embodiment, each of the base layer, the first upper base layer, and the first lower base layer may include PI, and each of the second upper base layer and the second lower base layer may include a reinforced fiber composite material.

In an embodiment, the sensing coils may include s first sensing coils and second sensing coils which are insulated from each other and each of which defines an open loop, and the digitizer may further include: contact holes defined in the outer portion and adjacent to an edge of the outer portion: a base layer which includes a top surface facing the display module and a bottom surface opposing the top surface and on which the first sensing coils and the second sensing coils are disposed: a first upper base layer disposed on the top surface of the base layer; a second upper base layer disposed on a top surface of the first upper base layer; and a lower base layer disposed on the bottom surface of the base layer.

In an embodiment, the first holes may include first group holes extending in the second direction and arranged in the second direction, and second group holes alternately arranged with the first group holes, shifted with respect to the first group holes in the second direction, extending in the second direction and arranged in the second direction, each of the second holes may be aligned with the first group holes in the second direction and arranged on an edge of the outer portion to define an opened opening, each of the third holes are alternately arranged with the second holes in the first direction and aligned with the second group holes in the second direction, and a portion of each of the first group holes aligned with the second holes in the second direction may be disposed on the outer portion.

In an embodiment, the connection lines may include: first upper lines disposed on the base layer: second upper lines disposed on the first upper base layer; and lower lines disposed below the base layer, where each of the first upper lines and the second upper lines may include: lower connection lines crossing an upper end of each of the first holes and a lower end of each of the third holes, which are defined in the outer portion, among the first holes; and upper connection lines crossing an upper end of each of the second holes and the third holes, where the lower lines may be arranged to be spaced apart from each other in the first direction, and each of the lower lines may be connected to a corresponding one of the contact holes correspondingly extending in the second direction.

In an embodiment, the first upper lines and the second upper lines may be connected to the corresponding lower lines through the contact holes.

In an embodiment, the digitizer may sense an external input in an electro magnetic resonance (EMR) manner.

In an embodiment, a width of the outer portion in the second direction may be greater than or equal to about 2 mm and less than or equal to about 4 mm.

In an embodiment, the display module may include: a display panel which displays the image; and an input sensor directly disposed on the display panel to sense an external input in a capacitive manner.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings:

FIG. 5B is a cross-sectional view of a bent display device according to an embodiment of the invention;

DETAILED DESCRIPTION

Figure 1A:
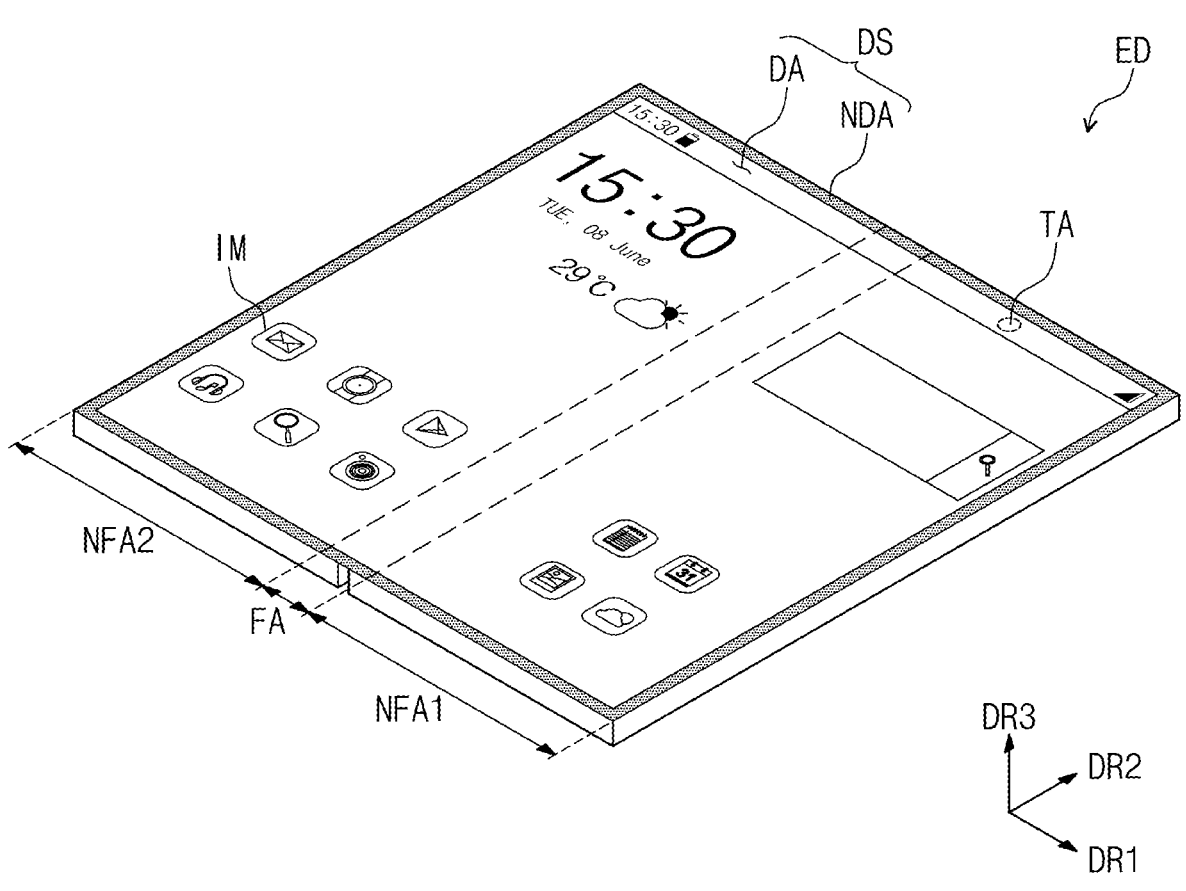
FIGS. 1A to 1C are perspective views of an electronic apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, it will also be understood that when one component (or area, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that although the terms such as 'first' and 'second' are used herein to describe various elements, these elements should not be limited by these terms. These terms are used only to distinguish one component from other components. For example, a first element referred to as a first element in an embodiment can be referred to as a second element in another embodiment without departing from the scope of the appended claims. The terms of a singular form may include plural forms unless referred to the contrary.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by a person of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the accompanying drawings.

Figure 1B:
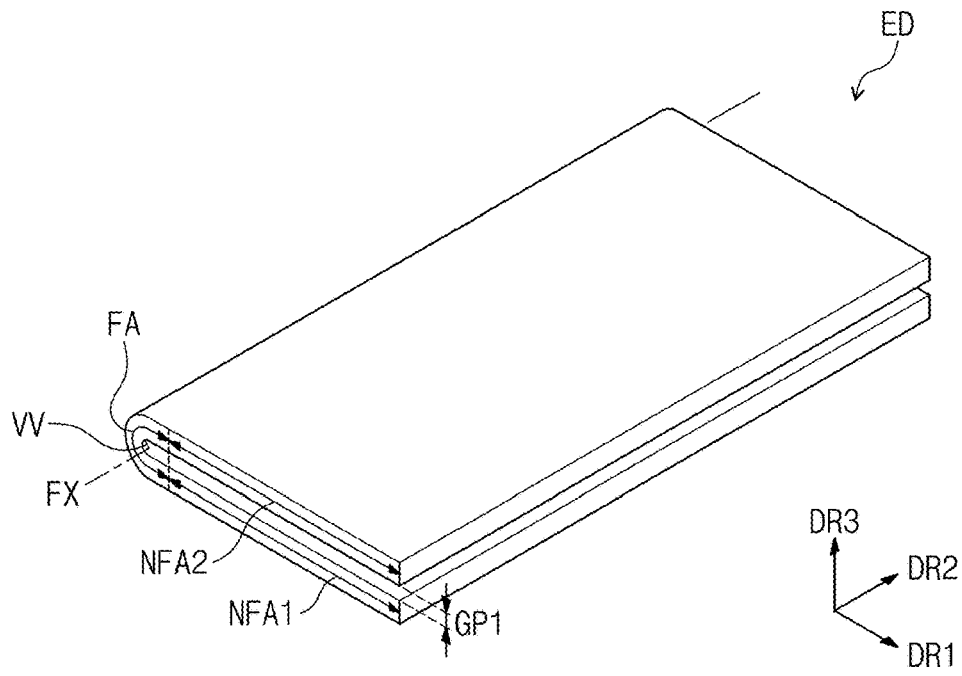
Figure 1C:
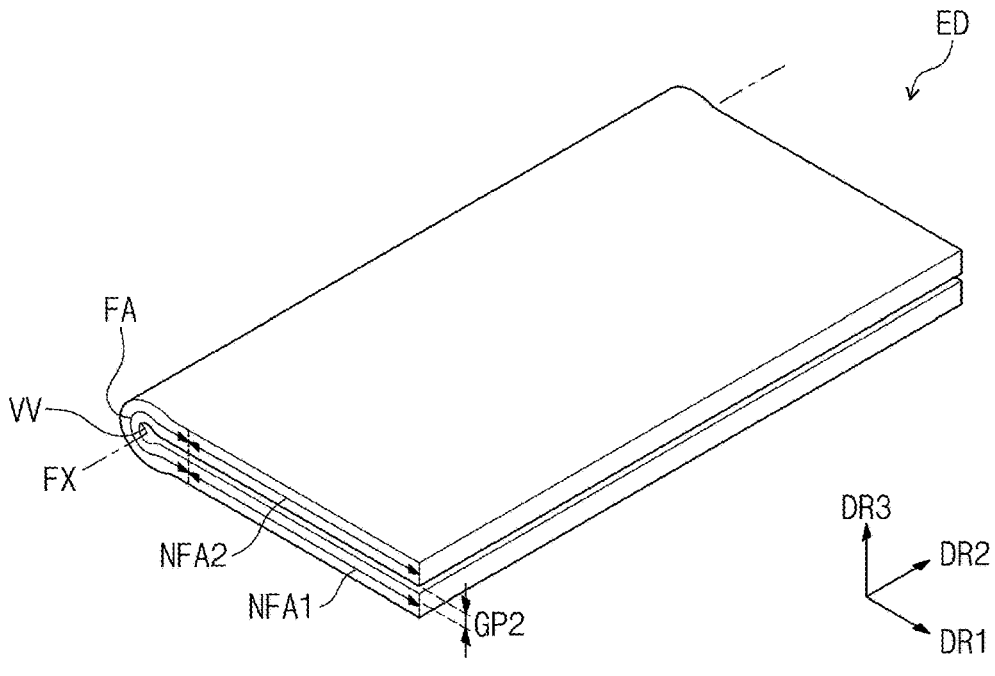

FIGS. 1A to 1C are perspective views of an electronic apparatus according to an embodiment of the invention. FIG. 1A illustrates an electronic apparatus in an unfolded state, and FIGS. 1B and 1C each illustrates an electronic apparatus in a folded state.

Referring to FIGS. 1A to 1C, an electronic apparatus ED according to an embodiment of the invention include a display surface DS defined by a first direction DR1 and a second direction DR2 crossing the first direction DR1. The electronic apparatus ED may provide an image IM to a user through the display surface DS.

The display surface DS may include a display area DA and a non-display area NDA adjacent to the display area DA. The display area DA may display the image IM, and the non-display area NDA may not display the image IM. The non-display area NDA may surround at least a portion of the display area DA. However, the embodiment of the invention is not limited thereto, and a shape of the display area DA and a shape of the non-display area NDA may be changed or variously modified.

The display surface DS may include a sensing area TA. The sensing area TA may be a partial area of the display area DA. The sensing area TA has light transmittance greater than that of each of other areas of the display area DA. Hereinafter, other areas of the display area DA except for the sensing area TA may be defined as a general display area.

An optical signal, for example, visible light or infrared light, may move (or be emitted) to the sensing area TA. The electronic apparatus ED may photograph an external image through the visible light passing through the sensing area TA or determine accessibility of an external object through the infrared light. Although FIG. 1A illustrates an embodiment where a single sensing area TA is provided, the embodiment of the invention is not limited thereto, and a plurality of sensing areas TA may be provided.

Hereinafter, a direction that substantially perpendicularly crosses a plane defined by the first direction DR1 and the second direction DR2 is defined as a third direction DR3. The third direction DR3 may be a thickness direction of the electronic apparatus ED. The third direction DR3 may be a reference for distinguishing front and rear surfaces of each of members from each other. In this specification, the term "on the plane" or "in a plan view" may be defined as a state when viewed in the third direction DR3.

The electronic apparatus ED may include a folding area FAI and non-folding areas NFA1 and NFA2. The non-folding areas NFA1 and NFA2 may include a first non-folding area NFA1 and a second non-folding area NFA2. The first non-folding area NFA1 and the second non-folding area NFA2 may be spaced apart from each other in the second direction DR2 with the folding area FA therebetween.

In an embodiment, as illustrated in FIG. 1B, the folding area FA may be folded (or foldable) with respect to a folding axis FX extending in the second direction DR2. The folding area FA may be folded with a predetermined curvature and curvature radius VV. A first spaced distance GP1 between the first non-folding area NFA1 and the second non-folding area NFA2 may be substantially greater twice than the curvature radius VV. In an embodiment, the first non-folding area NFA1 and the second non-folding area NFA2 may face each other, and the electronic apparatus ED may be in-folded so that the display surface DS is not exposed to the outside.

In an embodiment, as illustrated in FIG. 1C, in the state in which the electronic apparatus ED is folded, a second spaced distance GP2 between the first non-folding area NFA1 and the second non-folding area NFA2 may be less than twice of the curvature radius (or radius of curvature) VV. Thus, the spaced distance between the first non-folding area NFA1 and the second non-folding area NFA2 in the folded state may be reduced. Thus, a slimmer electronic apparatus ED may be provided when folded.

However, an embodiment of the invention is not limited thereto, and in an alternative embodiment, the electronic apparatus ED may be out-folded so that the display surface DS is exposed to the outside. According to an embodiment of the invention, the electronic apparatus ED may be configured to repeatedly perform an inner-folding operation or an outer-folding operation from an unfolding operation, but is not limited thereto. In an embodiment of the invention, the electronic apparatus ED may be configured to selectively perform one of the unfolding operation, the inner-folding operation, and the outer-folding operation.

Figure 2A:
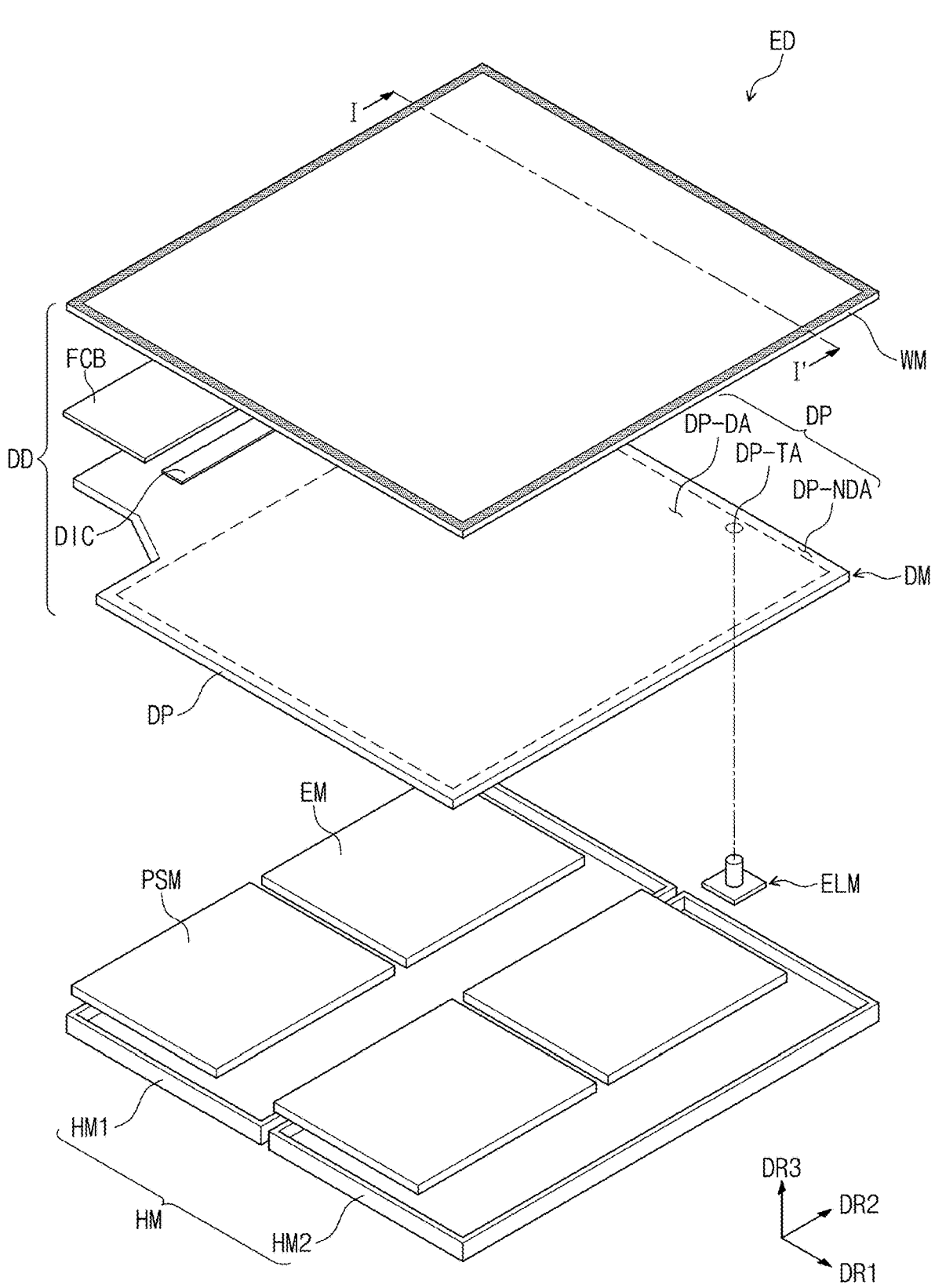
FIG. 2A is an exploded perspective view of the electronic apparatus according to an embodiment of the invention.
Figure 2B:
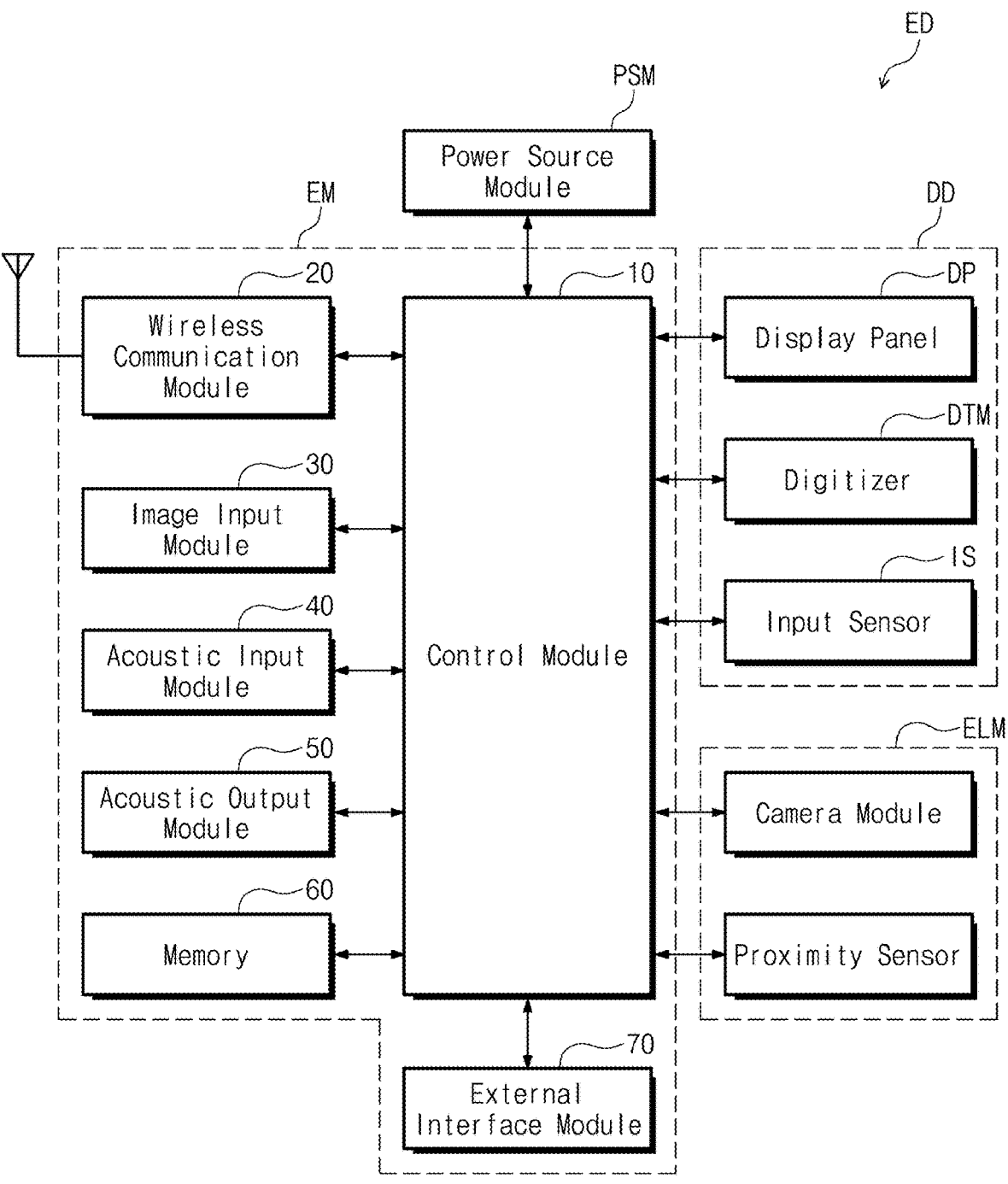
FIG. 2B is a block diagram of the electronic apparatus according to an embodiment of the invention.

FIG. 2A is an exploded perspective view of the electronic apparatus according to an embodiment of the invention. FIG. 2B is a block diagram of the electronic apparatus according to an embodiment of the invention.

Referring to FIGS. 2A and 2B, an embodiment of the electronic apparatus ED may include a display device DD, an electronic module EM, an electro-optical module ELM, a power source module PSM, and a housing HM. The electronic apparatus ED according to an embodiment may further include a mechanism structure (e.g., a hinge) bonded to the housing HM to control a folding operation of the display device DD.

The display device DD generates an image and senses an external input. The display device DD includes a window WM and a display module DM. The window WM provides a front surface of the electronic apparatus ED. The window WM will be described later in detail.

The display module DM may include a display panel DP. Although only the display panel DP in the laminated structure of the display module DM is illustrated in FIG. 2A for convenience of illustration, the display module DM may substantially further include a plurality of components disposed above the display panel DP. Detailed features of the laminated structure of the display module DM will be described later.

The type of display panel DP is not particularly limited. In an embodiment, for example, the display panel DP may be an emission type display panel such as an organic light emitting display panel or a quantum dot light emitting display panel.

The display panel DP includes a display area DP-DA corresponding to the display area DA (see FIG. 1A) and a non-display area DP-NDA corresponding to the non-display area NDA (see FIG. 1A) of the electronic apparatus ED. In this specification, "areas/portions correspond each other" may mean that the areas/portions overlap each other and are not limited to a case where the areas/portions have a same area as each other.

In an embodiment, as illustrated in FIG. 2A, a driving chip DIC may be disposed on the non-display area DP-NDA of the display panel DP. A flexible circuit board FCB may be bonded to the non-display area DP-NDA of the display panel DP. The flexible circuit board FCB may be connected to a main circuit board. The main circuit board may be one electronic component constituting the electronic module EM.

The driving chip DIC may include driving elements for driving pixels of the display panel DP, for example, a data driving circuit. FIG. 2A illustrates an embodiment having a structure in which the driving chip DIC is mounted on the display panel DP, but the embodiment of the invention is not limited thereto. In an alternative embodiment, for example, the driving chip DIC may be mounted on the flexible circuit board FCB.

In an embodiment, as illustrated in FIG. 2B, the display device DD may further include an input sensor IS and a digitizer DTM. The input sensor IS senses a user's input. The input sensor IS that senses an external input in a capacitive manner may be disposed above the display panel DP. The digitizer DTM senses an input of a stylus pen. The digitizer DTM according to an embodiment of the invention may sense an external input using an electro magnetic resonance (EMR) method. The digitizer DTM may be disposed below the display panel DP.

The electronic module EM may include a control module 10, a wireless communication module 20, an image input module 30, an acoustic input module 40, an audio output module 50, a memory 60, and an external interface module 70. The electronic module EM may include a main circuit board, and the modules may be mounted on the main circuit board or electrically connected to the main circuit board through the flexible circuit board. Each of the input sensor IS and the digitizer DTM may be connected to the main circuit board through a connector or the like. The electronic module EM is electrically connected to the power source module PSM.

The electronic module EM may be disposed in each of a first housing HM1 and a second housing HM2, and the power source module PSM may be disposed in each of the first housing HM1 and the second housing HM2. Although not shown, the electronic module EM disposed in the first housing HM1 and the electronic module EM disposed in the second housing HM2 may be electrically connected to each other through the flexible circuit board.

The control module 10 controls an overall operation of the electronic apparatus ED. In an embodiment, for example, the control module 10 activates or inactivate a display device DD in response to the user input. The control module 10 may control the image input module 30, the acoustic input module 40, the audio output module 50, and the like in accordance with the user input. The control module 10 may include at least one microprocessor.

The wireless communication module 20 may transmit/ receive a wireless signal to/from the other terminal by using Bluetooth or Wi-Fi. The wireless communication module 20 may transmit/receive a voice signal by using a general communication line. The wireless communication module 20 may include a plurality of antenna modules.

The image input module 30 processes image signal to convert the processed image signal into image data that is capable of being displayed on the display device DD. The acoustic input module 40 receives external acoustic signals by using a microphone during recording mode or a voice recognition mode to convert the received acoustic signal into electrical voice data. The audio output module 50 converts the audio data received from the wireless communication module 20 or the audio data stored in the memory 60 to output the converted audio data to the outside.

The external interface module 70 serves as an interface connected to an external charger, a wired/wireless data port, and a card socket (for example, a memory card and an SIM/UIM card).

The power source module PSM supplies power for the overall operation of the electronic apparatus ED. The power source module PSM may include a typical battery device.

The electro-optical module ELM may be an electronic component that outputs or receives an optical signal. The electro-optical module ELM may include a camera module and/or a proximity sensor. The camera module photographs an external image through the sensing area DP-TA. The electro-optical module ELM may be disposed below the display device DD to overlap the sensing area DP-TA.

The housing HM may be bonded to the window WM to accommodate the above-described other modules. The housing HM is illustrated as including first and second housings HU1 and HU2 separated from each other, but is not limited thereto. The electronic apparatus ED according to an embodiment may further include a hinge structure connecting the first and second housings HM1 and HM2 to each other.

Figure 3A:
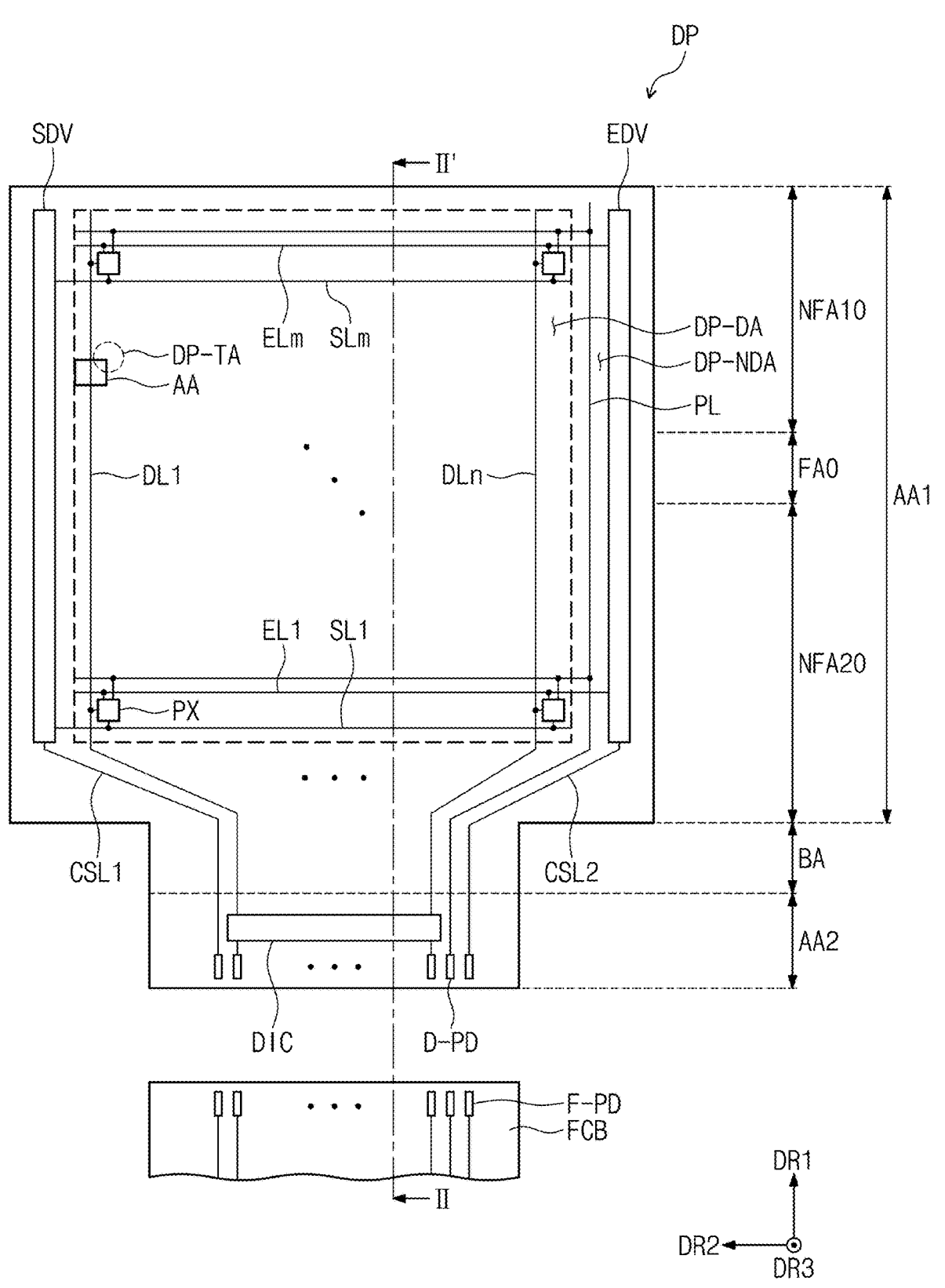
FIG. 3A is a plan view of a display panel according to an embodiment of the invention.
Figure 3B:
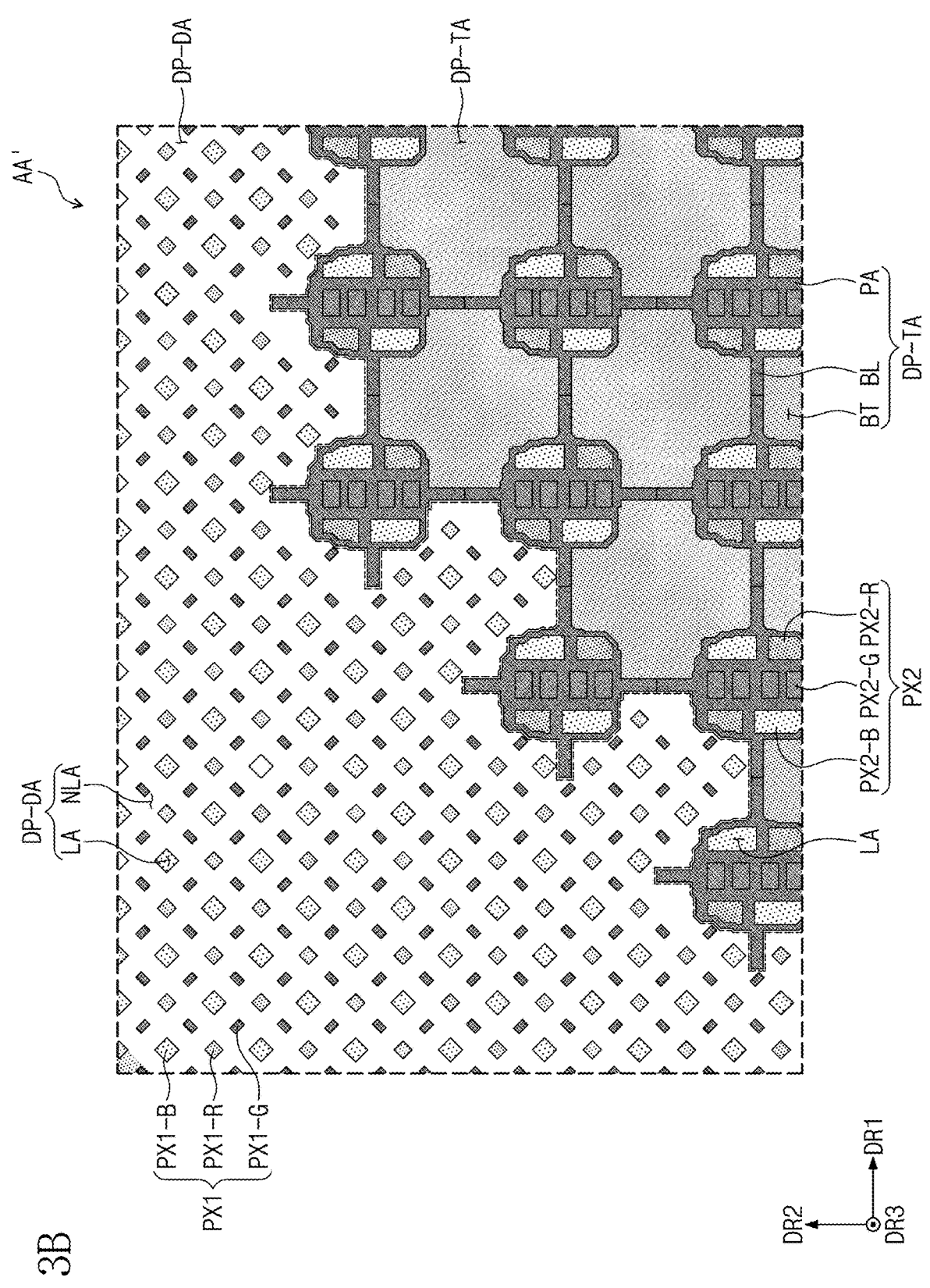
FIG. 3B is a partially enlarged plan view of an area of FIG. 3A.

FIG. 3A is a plan view of the display panel according to an embodiment of the invention. FIG. 3B is a partially enlarged plan view of an area of FIG. 3A.

Referring to FIG. 3A, an embodiment of the display panel DP may include a display area DP-DA and a non-display area DP-NDA disposed around the display area DP-DA. The display area DP-DA and the non-display area DP-NDA are distinguished by existence of a pixel PX. The pixel PX is disposed on the display area DP-DA. A scan driver SDV, a data driver, and an emission driver EDV may be disposed on the non-display area DP-NDA. The data driver may be a partial circuit configured in a driving chip DIC illustrated in FIG. 3A.

The display panel DP includes a first non-bending area AA1, a second non-bending area AA2, and a bending area BA, which are divided in the first direction DR1. Each of the second non-bending area AA2 and the bending area BA may be partial areas of the non-display area DP-NDA. The bending area BA is disposed between the first non-bending area AA1 and the second non-bending area AA2.

The first non-bending area AA1 may be an area corresponding to the display surface DS of FIG. 1A. The first non-bending area AA1 may include a first non-folding area NFA10, a second non-folding area NFA20, and a folding area FA0. The first non-folding area NFA10, the second non-folding area NF A20, and the folding area FA0 correspond to the first non-folding area NFA1, the second non-folding area NFA2, and the folding area FA of FIGS. 1A to 1C, respectively.

In the first direction DR1, a length of each of the bending area BA and the second non-bending area AA2 may be less than that of the first non-bending area AA1. The bending area BA having a relatively short length in the second direction DR2 may be easily bent with respect to a bending axis extending in the second direction DR2.

The display panel DP may include a plurality of pixels PX, a plurality of scan lines SL1 to SLm, a plurality of data lines DL1 to DLn, a plurality of emission lines ELI to ELm, first and second control lines CSL1 and CSL2, a power line PL, and a plurality of display pads D-PD. Here, m and n are natural numbers. The pixels PX may be connected to the scan lines SL1 to SLm, the data lines DL1 to DLn, and the emission lines EL1 to ELm.

The scan lines SL1 to SLm may extend in the first direction DR1 and be connected to the scan driver SDV. The data lines DL1 to DLn may extend in the first direction DR1 and be connected to the driving chip DIC via the bending area BA. The emission lines ELI to ELm may extend in the second direction DR2 and be connected to a gate driver EDV.

The first power line PLI may include a portion extending in the first direction DR1 and a portion extending in the second direction DR2. The portion extending in the second direction DR2 and the portion extending in the first direction DR1 may be disposed in (or directly on) different layers, respectively. The portion of the power line PL, which extends in the first direction DR1, may extend to the second non-bending area AA2 via the bending area BA. The power line PLI may provide pixels PX having a first voltage.

The first control line CSL1 may be connected to the scan driver SDV and extend toward the lower end of the second non-bending area AA2 via the bending area BA. The second control line CSL2 may be connected to the emission driver EDV and extend toward the lower end of the second non-bending area AA2 via the bending area BA.

On the plane, the display pads D-PD may be disposed adjacent to a lower end of the second non-bending area AA2. The driving chip DIC, the power line PL, the first control line CSL1, and the second control line CSL2 may be connected to the display pads D-PD. Substrate pads F-PD provided in the flexible printed circuit board FCB may be electrically connected to the corresponding display pads D-PD through an anisotropic conductive adhesive layer.

Referring to FIG. 3B, the sensing area DP-TA (first area) may be an area having light transmittance greater than that of the display area DP-DA (second area) and resolution less than that of the display area DP-DA (second area). The light transmittance and the resolution are measured within a reference area. The sensing area DP-TA has an occupancy rate of a light blocking structure within the reference area, which is less than that of the display area DP-DA. The light blocking structure may include a conductive pattern of a circuit layer, an electrode of a light emitting element, a light blocking pattern, or the like, which will be described later.

The sensing area DP-TA has a resolution within the reference area, which is less than that of the display area DP-DA. The smaller number of pixels may be disposed within a unit area in the reference surface (or the same area) compared to the number of pixels within the unit area in the display area.

In an embodiment, as illustrated in FIG. 3B, a first pixel PX1 may be disposed on the display area DP-DA, and a second pixel PX2 may be disposed on the sensing area DP-TA. When comparing surface areas of pixels having a same color as each other, the first pixel PX1 and the second pixel PX2 may have emission areas that are different from each other. The first pixel PX1 and the second pixel PX2 may have different arrangements.

In FIG. 3B, emission areas LA of the first pixel PX1 and the second pixel PX2 are shown to represent the first pixel PX1 and the second pixel PX2. Each of the emission areas LA may be defined as an area on which an anode of a light emitting element is exposed from a pixel defining layer. A non-emission area NLA is disposed between the emission areas LA within the display area DP-DA.

The first pixel PX1 may include a first color pixel PX1-R, a second color pixel PX1-G, and a third color pixel PX1-B, and the second pixel PX2 may include a first color pixel PX2-R, a second color pixel PX2-G, and a third color pixel PX2-B. The first color pixel PX1-R and the first color pixel PX1-R may provide red light, the second color pixel PX1-G and the second color pixel PX2-G may provide green light, and the third color pixel PX1-B and the third color pixel PX2-B may provide blue light.

The sensing area DP-TA may include a pixel area PA, a line area BL, and a transmission area BT. The second pixel PX2 is disposed within the pixel area PA. Although a structure in which two first color pixels PX2-R, four second color pixels PX2-G, and second third color pixels PX2-B are disposed within one pixel area PX is illustrated, the embodiment of the invention is not limited thereto.

A conductive pattern, a signal line, or a light blocking pattern related to the second pixel PX2 is disposed within the pixel area PA and the line area BL. The light blocking pattern may be a metal pattern and may substantially overlap the pixel area PA and the line area BL. Each of the pixel area PA and the line area BL may be a non-transmission area.

The transmission area BT is an area through which an optical signal substantially passes. Since the second pixel PX2 is not disposed on the transmission area BT, a conductive pattern, a signal line, or a light blocking pattern is disposed. Thus, the transmission area BT increases in light transmittance of the sensing area DP-TA. According to an embodiment, the electro-optical module ELM described in FIG. 2A may improve light signal reception efficiency because the electro-optical module ELM overlaps the sensing area DP-TA having high light transmittance.

Figure 4:
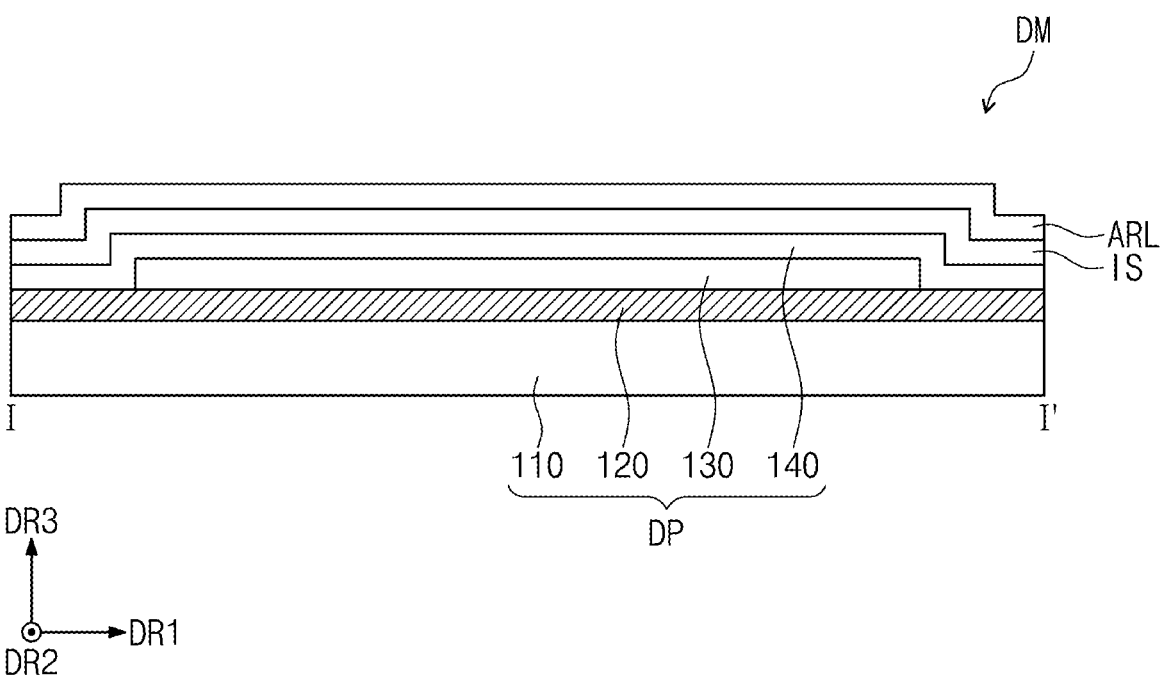
FIG. 4 is a cross-sectional view taken along line I-I' of FIG. 2A.

FIG. 4 is a cross-sectional view taken along line I-I' of FIG. 2A.

Referring to FIG. 4, an embodiment of the display module DM may include a display panel DP, an input sensor IS, and an antireflection layer ARL. The display panel DP may include a base layer 110, a circuit layer 120, a light emitting element layer 130, and an encapsulation layer 140.

The base layer 110 may provide a base surface on which the circuit layer 120 is disposed. The base layer 110 may be a flexible substrate capable of being bent, folded, or rolled. The base layer 110 may be a glass substrate, a metal substrate, or a polymer substrate. However, the embodiment of the invention is not limited thereto. In an embodiment, for example, the base layer 110 may be an inorganic layer, an organic layer, or a composite layer.

The base layer 110 may have a multilayered structure. In an embodiment, for example, the base layer 110 may include a first synthetic resin layer, a multilayer or single inorganic layer, and a second synthetic resin layer disposed on the multilayer or single inorganic layer. Each of the first and second synthetic resin layers may include a polyimide-based resin, but the embodiment of the invention is not limited thereto.

The circuit layer 120 may be disposed on the base layer 110. The circuit layer 120 may include an insulating layer, a semiconductor pattern, a conductive pattern, and a signal line.

The circuit layer 120 may be disposed on the base layer 110. The circuit layer 120 includes at least one insulating layer and a circuit element. The insulating layer includes at least one inorganic layer and at least one organic layer. The circuit element includes signal lines, a driving circuit of the pixel, and the like.

The circuit layer 120 may be formed through a process of manufacturing a typical circuit element in which an insulating layer, a semiconductor layer, and a conductive layer are formed through a method such as coating or deposition and then are selectively patterned by a photolithography and etching process to form a semiconductor pattern, a conductive pattern, a signal line, and the like.

The light emitting element layer 130 may be disposed on the circuit layer 120. The light emitting element layer 130 may include a light emitting element. In an embodiment, for example, the light emitting element may include an organic light emitting material, an inorganic light emitting material, an organic-inorganic light emitting material, a quantum dot, a quantum rod, a micro light emitting diode (LED), or a nano LED.

An encapsulation layer 140 may be disposed on the light emitting element layer 130. The encapsulation layer 140 may protect the light emitting element layer 130 against foreign substances such as moisture, oxygen, and dust particles. The encapsulation layer 140 may include at least one inorganic layer. The encapsulation layer 140 may include a laminated structure of an inorganic layer/organic layer/inorganic layer.

The input sensor IS may be directly disposed on the display panel DP. The display panel DP and the input sensor IS may be formed through a continuous process. Here, "directly disposed" may mean that a third component is not disposed between the input sensor IS and the display panel DP. That is, a separate adhesive layer may not be disposed between the input sensor IS and the display panel DP.

The antireflection layer ARL may be directly disposed on the input sensor IS. The antireflection layer ARL may reduce reflectance of external light incident from the outside of the display device DD (see FIG. 1). The antireflection layer RPL may include color filters. The color filters may have a predetermined arrangement. In an embodiment, for example, the color filters may be arranged in consideration of emission colors of the pixels provided in the display panel DP. Also, the antireflection layer ARL may further include a black matrix adjacent to the color filters.

In an embodiment of the invention, positions of the input sensor IS and the antireflection layer ARL may be interchanged with each other. In an embodiment of the invention, the antireflection layer ARL may be replaced with a polarizing film. The polarizing film may be bonded to the input sensor IS through the adhesive layer.

Figure 5A:
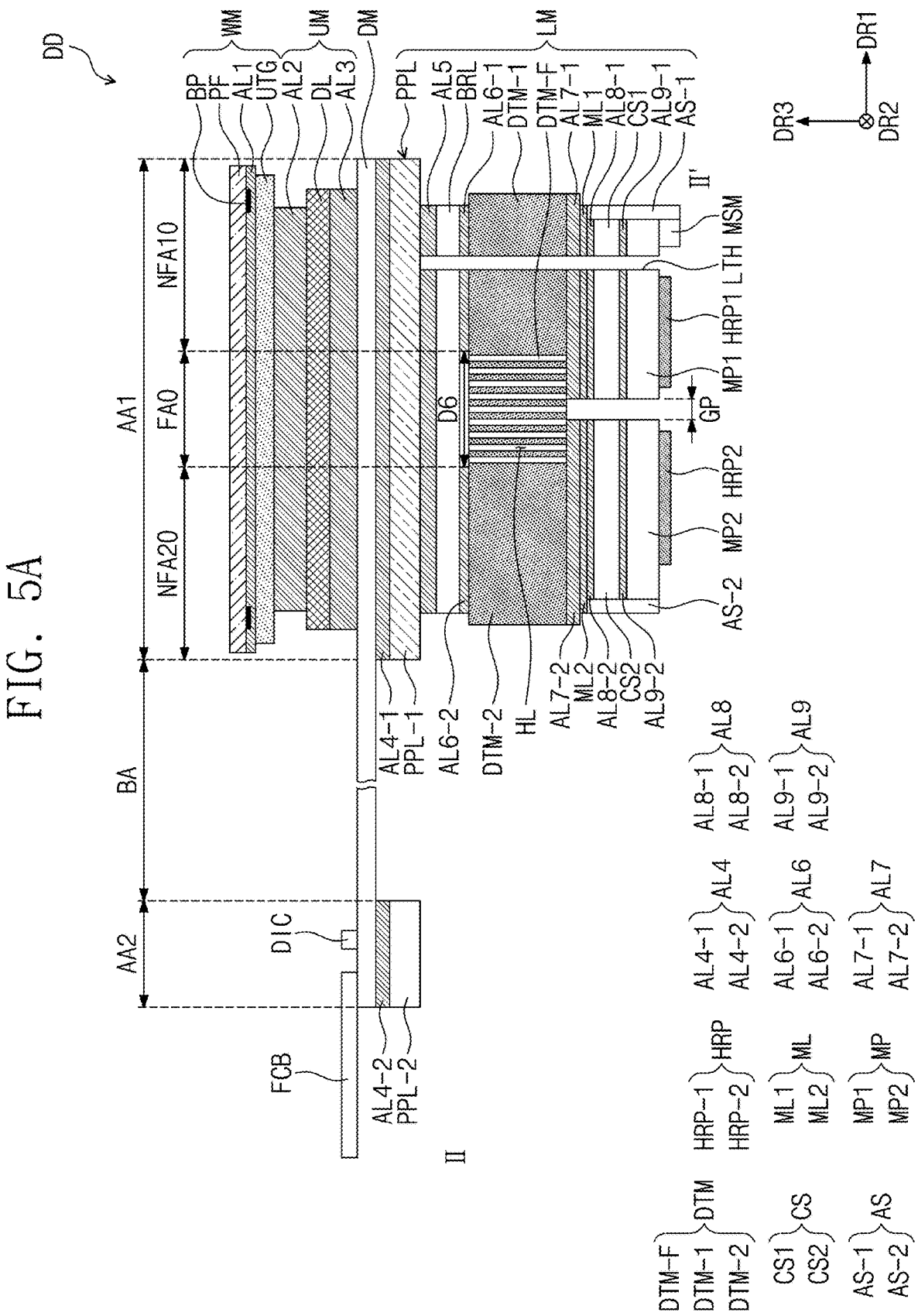
FIG. 5A is a cross-sectional view taken along line II-II' of FIG. 3A.
Figure 5B:
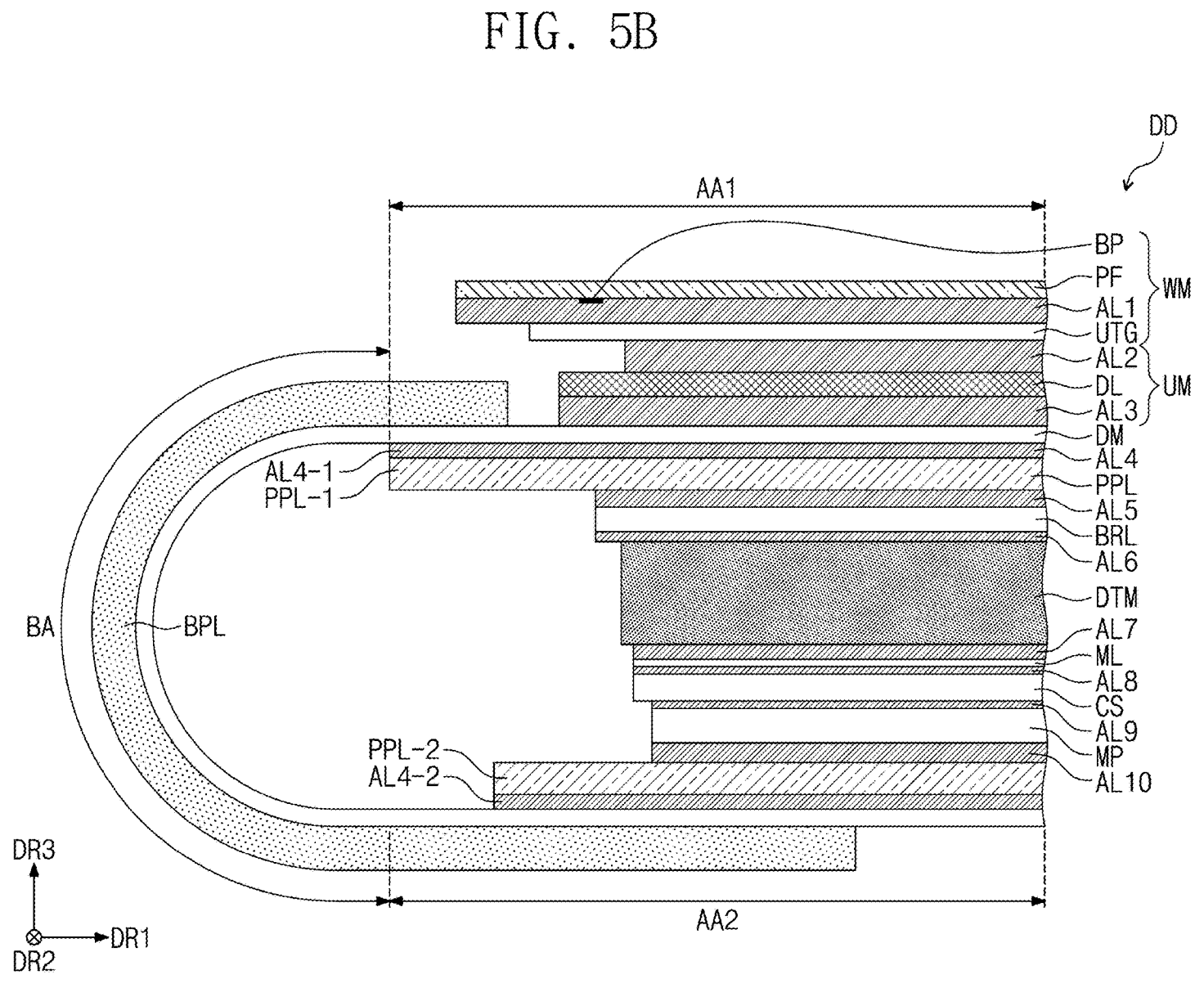

FIG. 5A is a cross-sectional view taken along line II-II' of FIG. 3A. FIG. 5B is a cross-sectional view of a bent display device according to an embodiment of the invention.

Referring to FIGS. 5A and 5B, an embodiment of the display device DD includes a window WM, an upper member UM, a display module DM, and a lower member LM. The upper member UM refers to a configuration disposed between the window WM and the display module DM, and the lower member LM refers to a configuration disposed below the display module DM.

The window WM may include a thin-film glass substrate UTG, a window protective layer PF disposed on the thin-film glass substrate UTG, and a bezel pattern BP disposed on a bottom surface of the window protective layer PF. In an embodiment, the window protective layer PF may include a synthetic resin film.

The bezel pattern BP may be disposed on one surface of the thin-film glass substrate UTG or one surface of the window protective layer PF. FIG. 5B illustrates an embodiment where the bezel pattern BP is disposed on the bottom surface of the window protective layer PF. The embodiment of the invention is not limited thereto, and the bezel pattern BP may be disposed on the top surface of the window protective layer PF. The bezel pattern BP may be formed as a colored light blocking layer, for example, in a coating manner. The bezel pattern BP may include a base material and a dye or pigment mixed with the base material. The non-display area NDA illustrated in FIG. 1A may be defined by a shape of the bezel pattern BP.

The thin-film glass substrate UTG may have a thickness in a range of about 15 micrometers ($\mu$m) to about 45 $\mu$m. The thin-film glass substrate UTG may be chemically strengthened glass. An occurrence of wrinkles may be minimized even if the thin film glass substrate UTG is repeatedly folded and unfolded.

The window protective layer PF may have a thickness in a range of about 50 $\mu$m to about 80 $\mu$m. The window protective layer PF may include polyimide, polycarbonate, polyamide, triacetylcellulose, polymethylmethacrylate, or polyethylene terephthalate. Although not shown separately, at least one of selected from hard coating layer, an anti-fingerprint layer, or an antireflection layer may be disposed on a top surface of the window protective layer PF.

The window protective layer PF and the thin-film glass substrate UTG may be bonded to each other by a first adhesive layer AL1. The first adhesive layer AL1 may be a pressure sensitive adhesive film (PSA) or an optically clear adhesive (OCA). Adhesive layers to be described below are also the same as the first adhesive layer AL1.

The first adhesive layer AL1 may be separated from the thin-film glass substrate UTG. That is, adhesive force between the first adhesive layer AL1 and the thin-film glass substrate UTG may be less than that between the first adhesive layer AL1 and the window protective layer PF. In such an embodiment where the window protective layer PF is disposed above the thin-film glass substrate UTG, scratches may occur relatively easily. After the first adhesive layer AL1 and the window protective layer PF are separated from each other, a new window protective layer PF may be attached to the thin-film glass substrate UTG.

On the plane, an edge of the thin-film glass substrate UTG may not overlap the bezel pattern BP. As the above conditions are satisfied, the edge of the thin-film glass substrate UTG may be exposed from the bezel pattern BP, and fine cracks generated in the edge of the thin-film glass substrate UTG may be inspected through an inspection device.

The upper member UM includes an upper film DL. The upper film DL may include a synthetic resin film. The synthetic resin film may include polyimide, polycarbonate, polyamide, triacetylcellulose, polymethylmethacrylate, or polyethylene terephthalate.

The upper film DL may absorb an external impact applied to the front surface of the display device DD. The display module DM described with reference to FIG. 4 may include the antireflection layer ARL that replaces the polarizing film, and as a result, front impact strength of the display device DD may be reduced. The upper film DL may compensate for the reduced impact strength by applying the antireflection layer ARL. In an embodiment of the invention, the upper film DL may be omitted. The thin-film glass substrate UTG and the upper film DL may be bonded to each other by a second adhesive layer AL2. The upper film DL and the display module DM may be bonded to each other by a third adhesive layer AL3.

The lower member LM may include a panel protective layer PPL, a barrier layer BRL, a digitizer DTM, a metal layer ML, a cushion layer CS, a metal plate MP, a heat dissipation layer HRP, a magnetic shielding sheet MSM, and a step compensating member AS. In the lower member LM, the components other than the digitizer DTM may be defined as functional layers.

The panel protective layer PPL may be disposed below the display module DM. The panel protective layer PPL may protect a lower portion of the display module DM. The panel protective layer PPL may include a flexible synthetic resin film. In an embodiment, for example, the panel protective layer PPL may include polyethylene terephthalate.

In an embodiment, the panel protective layer PPL may not be disposed on (or not overlap) the bending area BA. The panel protective layer PPL may include a first panel protective layer PPL-1 protecting the first non-bending area AA1 of the display panel DP and a second panel protective layer PPL-2 protecting the second non-bending area AA2 of the display panel DP.

The fourth adhesive layer AL4 bonds the panel protective layer PPL to the display module DM. The fourth adhesive layer AL4 may include a first portion AL4-1 corresponding to the first panel protective layer PPL-1 and a second portion AL4-2 corresponding to the second panel protective layer PPL-2.

In an embodiment, as illustrated in FIG. 5B, when the bending area BA is bent, the second panel protective layer PPL-2 may be disposed below the first non-bending area AA1 and the first panel protective layer PPL-1 together with the second non-bending area AA2. Since the panel protective layer PPL is not disposed on the bending area BA, the bending area BA may be more easily bent. The second panel protective layer PPL-2 may be attached to the metal plate MP through a tenth adhesive layer AL10. Alternatively, the tenth adhesive layer AL10 may be omitted. Although not separately shown, an additional component such as an insulating tape may be further disposed between the second panel protective layer PPL-2 and the metal plate MP.

In an embodiment, as illustrated in FIG. 5B, the bending area BA has a predetermined curvature and curvature radius (or radius of curvature). The curvature radius may be in a range of about 0.1 millimeter (mm) to about 0.5 mm. The bending protective layer BPL is disposed on at least the bending area BA. The bending protective layer BPL may overlap the bending area BA, the first non-bending area AA1, and the second non-bending area AA2. The bending protective layer BPL may be disposed on the entire area of the bending area BA and may be disposed on a portion of the first non-bending area AA1 and a portion of the second non-bending area AA2.

The bending protective layer BPL may be bent together with the bending area BA. The bending protective layer BPL protects the bending area BA from an external impact and controls a neutral plane of the bending area BA. The bending protective layer BPL controls stress of the bending area BA so that the neutral plane approaches the signal lines disposed on the bending area BA.

Referring back to FIG. 5A, the barrier layer BRL may be disposed below the panel protective layer PPL. The barrier layer BRL and the panel protective layer PPL may be bonded to each other through a fifth adhesive layer AL5.

The barrier layer BRL may improve resistance to compressive force due to external pressing. Thus, the barrier layer BRL may serve to prevent deformation of the display panel DP from occurring. The barrier layer BRL may include a flexible plastic material such as polyimide or polyethylene terephthalate. Also, the barrier layer BRL may be a colored film having low light transmittance. The barrier layer BRL may absorb light incident from the outside. In an embodiment, for example, the barrier layer BRL may be a black synthetic resin film. When viewing the display device DD from an upper side of the window protective layer PF, the components disposed below the barrier layer BRL may not be visually recognized by the user.

A sixth adhesive layer AL6 bonds the barrier layer BRL to the digitizer DTM. The sixth adhesive layer AL6 may include a first portion AL6-1 and a second portion AL6-2, which are spaced apart from each other. A spaced distance (or interval) D6 between the first portion AL6-1 and the second portion AL6-2 corresponds to a width of a folding area FA0 and is greater than a gap GP to be described later. The spaced distance D6 between the first portion AL6-1 and the second portion AL6-2 may be in a range about 5 mm to about 15 mm.

In this embodiment, the first portion AL6-1 and the second portion AL6-2 are defined as different portions of one adhesive layer, but is not limited thereto. When the first portion AL6-1 is defined as one adhesive layer (e.g., the first adhesive layer or the second adhesive layer), the second portion AL6-2 may be defined as the other adhesive layer (e.g., the second adhesive layer or the third adhesive layer). All of the above definitions may be applied not only to the sixth adhesive layer AL6 but also to adhesive layers including the two portions among adhesive layers to be described later.

The digitizer DTM according to an embodiment of the invention may sense an input by an electromagnetic pen. Here, the digitizer DTM may sense the input by the electromagnetic pen in a method using electro magnetic resonance (EMR) by electromagnetic induction.

The digitizer DTM may include a first non-folding part DTM-1 overlapping the first non-folding area NFA10, a folding part DTM-F overlapping the folding area FA0, and a second non-folding part DTM-2 overlapping the second non-folding area NFA20.

In an embodiment, the foldable part DTM-F may include holes HL defined or formed through the foldable part DTM-F or extending from a top surface to a rear surface of the foldable part DTM-F to facilitate the folding operation of the electronic apparatus ED.

In the sensing coils provided in the digitizer DTM, the sensing coils passing through the folding part DTM-F around the holes HL defined therein may be concentrated at the outermost side of the folding part DTM-F to cause a difference in sensing performance with respect to the folding part DTM-F. Thus, in the digitizer DTM including the holes HL in the folding part DTM-F, it is desired to supplement the sensing performance of the outermost portion of the folding part DTM-F.

The metal layer ML may be disposed below the digitizer DTM. The metal layer ML may include a first metal layer ML1 and a second metal layer ML2, which respectively overlap the first non-folding part DTM-1 and the second non-folding part DTM-2. Each of the first metal layer ML1 and the second metal layer ML2 may overlap a portion of the folding part DTM-F and may be spaced apart from each other on an area overlapping the folding part DTM-F.

The metal layer ML may release heat generated when the digitizer DTM is driven to the outside. The metal layer ML transfers the heat generated by the digitizer DTM to a lower side. The metal layer ML may have electrical conductivity and thermal conductivity greater than those of a metal plate MP to be described later. The metal layer ML may include copper or aluminum. The metal layer ML having the relatively high electrical conductivity may block electromagnetic waves, which are generated from the electronic module EM (see FIG. 2A) disposed below the digitizer DTM, from being affected on the digitizer DTM as noise.

The seventh adhesive layer AL7 may bond the digitizer DTM to the metal layer ML. The seventh adhesive layer AL7 may include a first portion AL7-1 and a second portion AL7-2, which respectively correspond to the first metal layer ML1 and the second metal layer ML2.

The cushion layer CS may be disposed under the metal layer ML. The cushion layer CS may protect the display module DM from an impact transmitted from a lower portion of the display module DM. The cushion layer CS may include a first cushion layer CS1 and a second cushion layer CS2, which respectively overlap the first non-folding part DTM-1 and the second non-folding part DTM-2. Each of the first cushion layer CS1 and the second cushion layer CS2 may overlap a portion of the folding part DTM-F and may be spaced apart from each other on an area overlapping the folding part DTM-F.

The first cushion layer CS1 and the second cushion layer CS2 may effectively prevent foreign substances from being introduced into the holes HL when the display device DD is folded. In addition, when the display device DD is unfolded, even if the folding part DTM-F is folded at a predetermined curvature, since the first cushion layer CS1 and the second cushion layer CS2 are spaced apart from each other on the area overlapping the folding part DTM-F, the digitizer DTM may be easily deformed in shape.

The cushion layer CS may include a foam or a sponge. The foamed foam may include polyurethane foam or thermoplastic polyurethane foam. In an embodiment where the cushion layer CS includes the foam, a barrier film may be added as a base layer, and a foaming agent may be foamed on the barrier film to form the cushion layer CS.

An eighth adhesive layer AL8 may bond the metal layer ML to the cushion layer CS. The eighth adhesive layer AL8 may include a first portion AL8-1 and a second portion AL8-2, which respectively correspond to the first cushion layer CS1 and the second cushion layer CS2.

The metal plate MP may be disposed below the cushion layer CS. The metal plate MP may include a first metal plate MP1 and a second metal plate MP2, which respectively overlap the first cushion layer CS1 and the second cushion layer CS2. The metal plate MP may absorb an external impact applied from the lower side. The metal plate MP may have strength and a thickness greater than those of the metal layer ML. The metal plate MP may include a metal material such as stainless steel.

A ninth adhesive layer AL9 bonds the cushion layer CS to the metal plate MP. The ninth adhesive layer AL9 may include a first portion AL9-1 and a second portion AL9-2, which respectively correspond to the first metal plate MP1 and the second metal plate MP2.

A heat dissipation layer HRP may be disposed below the metal plate MP. The heat dissipation layer HRP may include a first heat dissipation layer HRP-1 and a second heat dissipation layer HRP-2, which respectively overlap the first metal plate MP1 and the second metal plate MP2. The heat dissipation layer HRP releases heat generated from electronic components disposed at the lower side. The electronic components may be the electronic module EM illustrated in FIGS. 2A and 2B. The heat dissipation layer HRP may have a structure in which an adhesive layer and a graphite layer are alternately laminated. The heat dissipation layer HRP may be attached to the metal plate MP through an additional adhesive layer disposed between the heat dissipation layer HRP and the metal plate MP.

A magnetic field shielding sheet MSM is disposed below the metal plate MP. The magnetic field shielding sheet MSM shields the magnetic field generated by a magnetic body (not shown) disposed at the lower side. The magnetic field shielding sheet MSM may prevent the magnetic field generated from the magnetic material from interfering with the digitizer DTM.

The magnetic field shielding sheet MSM includes a plurality of portions. At least a portion of the plurality of portions may have a different thickness. The plurality of portions may be disposed to correspond to stepped portions of a bracket (not shown) disposed below the display device DD. The magnetic field shielding sheet MSM may have a structure in which the magnetic field shielding layer and the adhesive layers are alternately laminated. A portion of the magnetic field shielding sheet MSM may be directly attached to the metal plate MP.

The step compensating member AS is bonded to a lower side of the seventh adhesive layer Al7. The step compensating member AS may be a double-sided tape or an insulating film. The step compensating member AS may be provided as a first step compensating member AS-1 and a second step compensating member AS-2 to compensate for a stepped portion occurring due to a difference in width between the components provided in the lower member LM.

In the lower member LM, the functional layers disposed below the first non-folding part DTM-1 and the second non-folding part DTM-2 may be disposed to be spaced a predetermined gap GP from each other on an area overlapping the folding part DTM-F. The gap GP may be in a range of about 0.3 mm to about 3 mm.

A through-hole LTH may be defined in some members of the lower members LM. The through-hole LTH is defined to overlap the sensing area DP-TA of FIG. 2A. As illustrated in FIG. 5A, the through-hole LTH may pass from the fifth adhesive layer AL5 to the metal plate MP. The through-hole LTH may have a structure that is similar to a structure from which the light blocking structure is removed from a path of the optical signal, and the through-hole LTH may improve optical signal reception efficiency of the electro-optical module ELM.

In the electronic apparatus ED according to an embodiment, at least one selected from the metal layer ML, the cushion layer CS, the metal plate MP, and the step compensating member AS may be omitted, but is not limited thereto.

Figure 6:
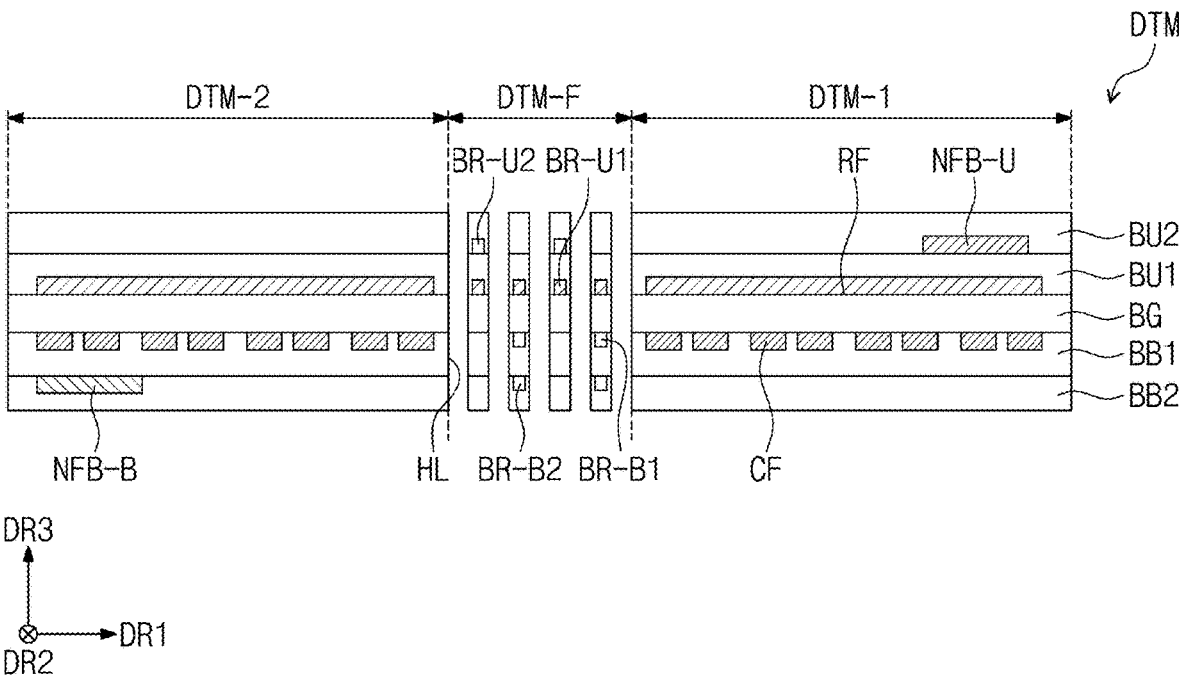
FIG. 6 is a cross-sectional view of a digitizer according to an embodiment of the invention.
Figure 7A:
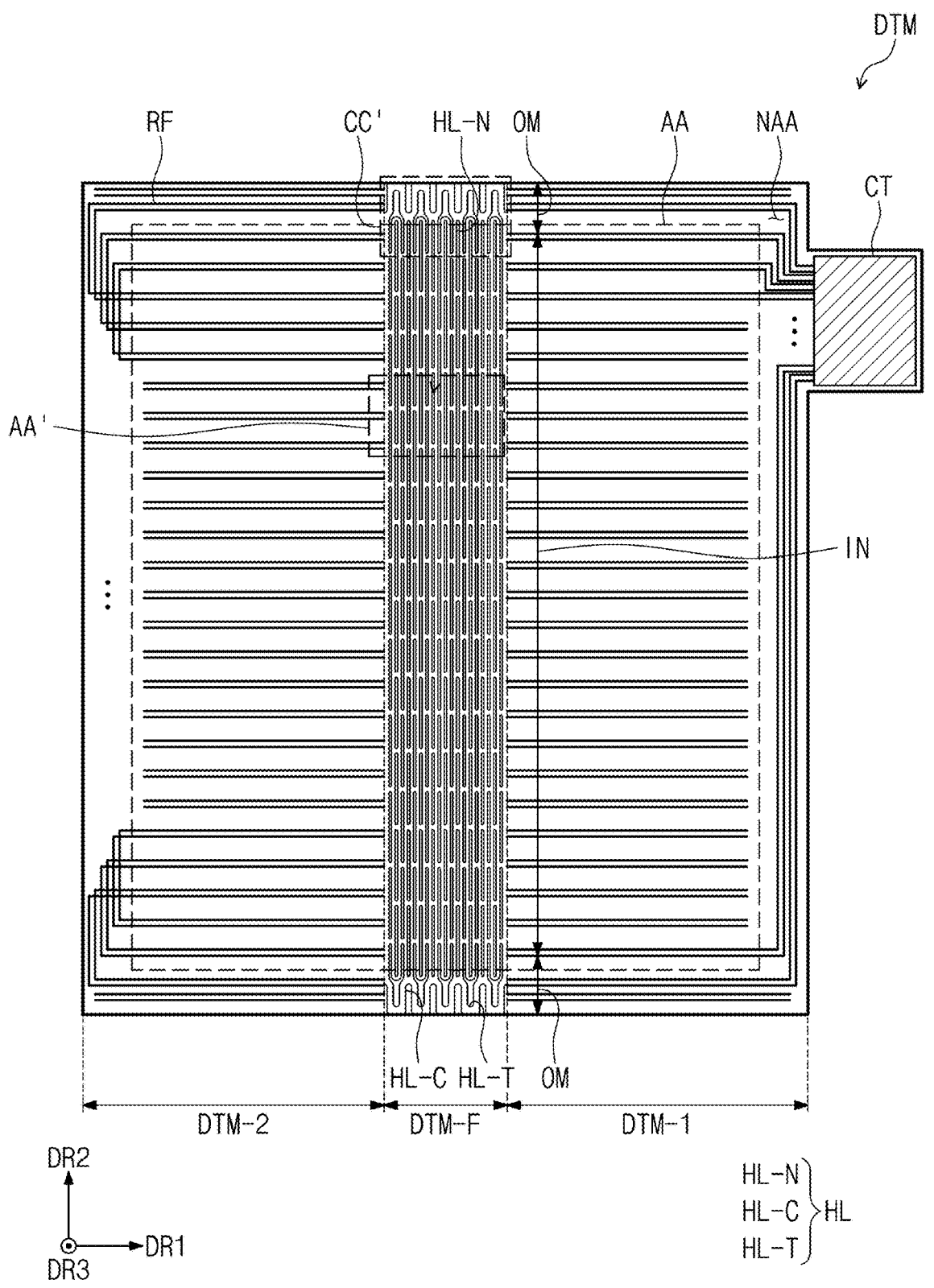
FIG. 7A is a plan view of the digitizer according to an embodiment of the invention.
Figure 7B:
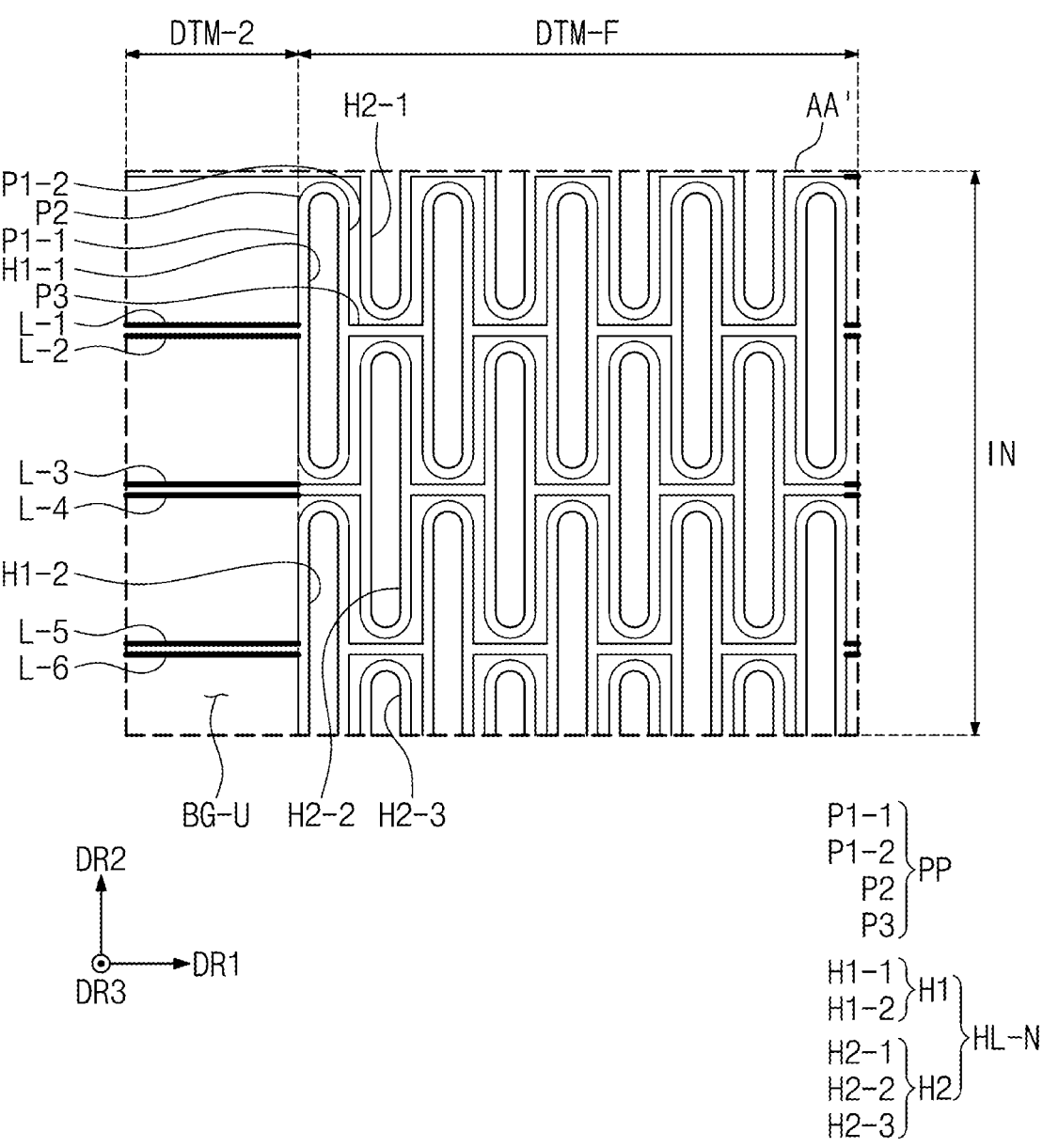
FIG. 7B is an enlarged plan view of an area AA' of FIG. 7A.
Figure 8A:
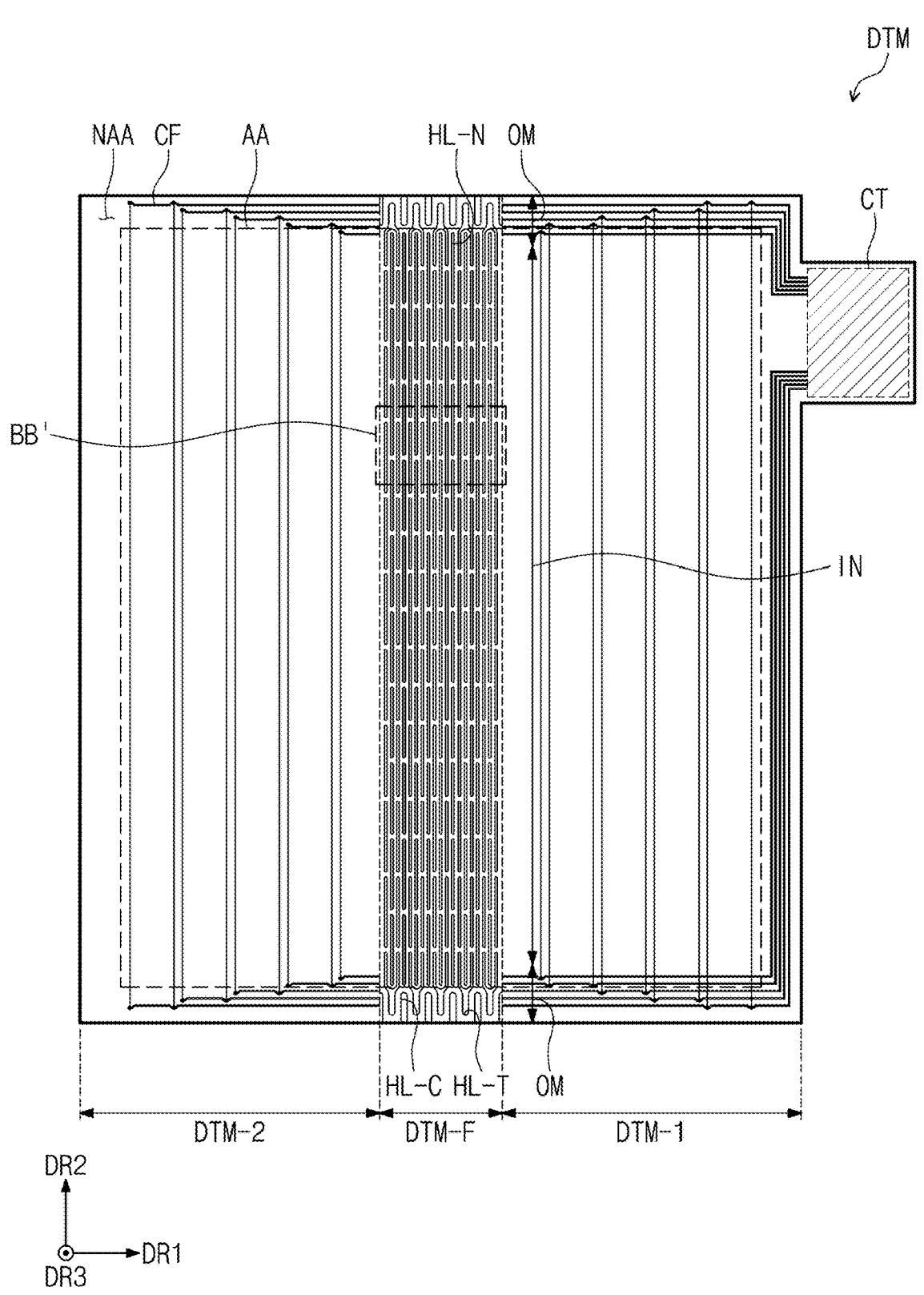
FIG. 8A is a plan view of the digitizer according to an embodiment of the invention.
Figure 8B:
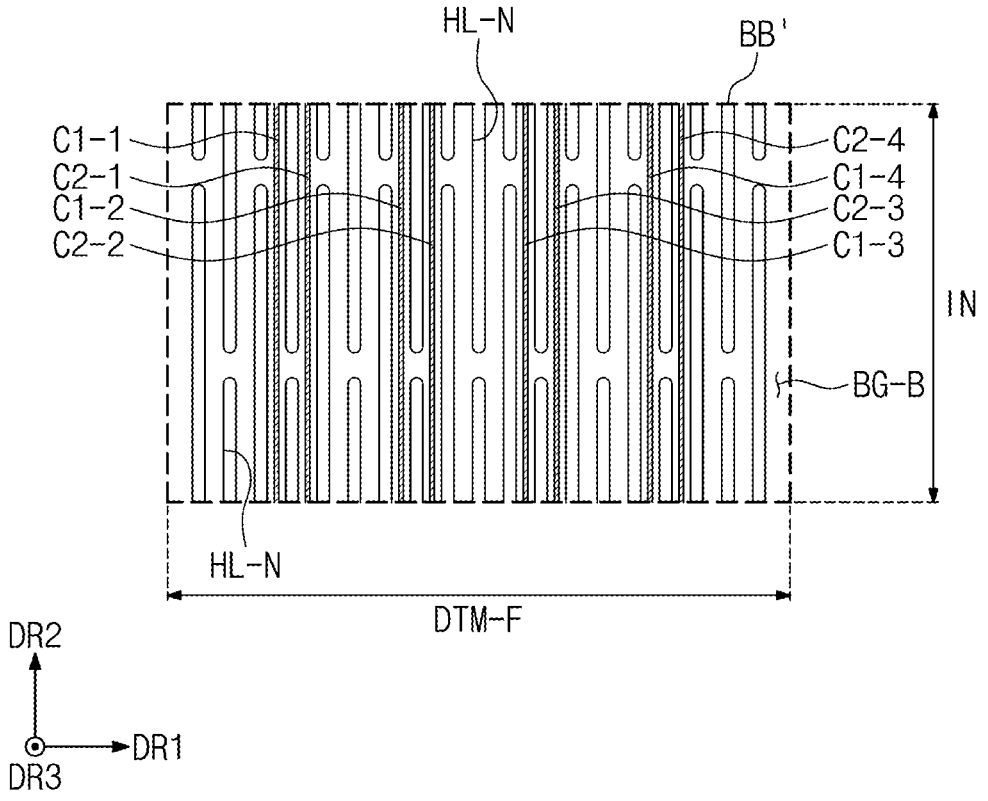
FIG. 8B is an enlarged plan view of an area BB' of FIG. 8A.

FIG. 6 is a cross-sectional view of a digitizer according to an embodiment of the invention. FIG. 7A is a plan view of the digitizer according to an embodiment of the invention. FIG. 7B is an enlarged plan view of an area AA' of FIG. 7A. FIG. 8A is a plan view of the digitizer according to an embodiment of the invention. FIG. 8B is an enlarged plan view of an area BB' of FIG. 8A.

Referring to FIG. 6, the digitizer DTM according to an embodiment may include a plurality of base layers BG, BU1, BU2, BB1, and BB2, first sensing coils RF, second sensing coils CF, and connection lines BR-U1, BR-U2, BR-B1, and BR-B2.

In this specification, the 'connection lines' may be used as a general term for coils disposed on the folding part DTM-F of the digitizer DTM. The 'connection lines' may be defined as 'connection lines' connecting lines connected to the second sensing coils CF in a case where the connection lines connect the first sensing coils RF that are spaced apart from each other with the folding part DFM-F therebetween, or a portion of the second sensing coils CF disposed on at least one of the first non-folding part DTM-1 and the second non-folding part DTM-2, and a remaining portion folded to form an open loop. The 'connection lines' may be substantially a portion of the first sensing coils RF or a portion of the second sensing coils CF, but will be described as separate configurations for clarity and convenience of description.

Each of the first sensing coils RF and the second sensing coils CF may be insulated from each other to form an open loop. Some of the first sense coils RF may overlap each other on the plane, and the overlapping portions may be connected to each other through contact lines NFB-U and NFB-B via difference layers. In an embodiment, for example, some of the first sense coils RF may be connected to the upper contact lines NFB-U disposed on the first upper base layer BU1. In addition, other portions of the first sense coils RF may be connected to the lower contact lines NFB-B disposed under the first lower base layer BB1, but are not limited to any one embodiment.

Some of the second sense coils CF may overlap each other on the plane, and the overlapping portions may be connected to each other through contact lines NFB-U and NFB-B via difference layers. In an embodiment, for example, some of the second sense coils CF may be connected to the upper contact lines NFB-U disposed on the first upper base layer BU1. In addition, other portions of the second sense coils CF may be connected to the lower contact lines NFB-B disposed under the first lower base layer BB1, but are not limited to any one embodiment. Although the contact lines NFBU and NFB-B illustrated in FIG. 6 are illustrated as having a single number of contact lines floated for convenience of description, each of the contact lines NFBU and NFB-B may be provided in plurality to be connect the corresponding first and second sensing coils RF and CF.

Each of the first sensing coils RF and the second sensing coils CF may include one of copper and copper plating.

Each of the base layers BG, BU1, BU2, BB1, and BB2 may include a matrix including a filler and woven fiber lines disposed inside the matrix. Each of the fiber lines may be provided in a bundle form in which a plurality of fibers are gathered. A diameter of one fiber provided in one fiber line may be greater than or equal to about 3 μm and less than or equal to about 10 μm.

Each of the fiber lines may include a reinforced fiber composite. The reinforced fiber composite may be one of carbon fiber-reinforced plastic (CFRP) and glass fiber-reinforced plastic (GFRP). The fiber lines may be disposed inside the matrix.

The matrix according to an embodiment may include at least one selected from epoxy, polyester, polyamides, polycarbonates, polypropylene, polybutylene, and vinyl ester.

The matrix may include a filler. The filler may include at least one selected from silica, barium sulphate, sintered talc, barium titanate, titanium oxide, clay, alumina, mica, boehmite, zinc borate, and zinc tartrate.

According to an embodiment, the base layer BG may include polyimide, and each of the remaining base layers BU1, BU2, BB1, and BB2 may include a reinforced fiber composite material. However, the embodiment of the invention is not limited thereto, and a portion of the base layers BG, BU1, and BB1 may include polyimide, and each of the remaining base layers BU2 and BB2 may include a reinforced fiber composite.

Referring to FIG. 7A, each of the first sensing coils RF may include long sides extending in the first direction DR1 and short sides extending in the second direction DR2 and connected to corresponding long sides. Most of the long sides may be disposed on an active area AA, and most of the short sides may be disposed on a peripheral area NAA.

According to an embodiment, each of the first sensing coils RF may rotate (or be wound) at least twice, and at least one of two opposing ends thereof may be connected to a connector CT. In the first sensing coils RF, at least a portion of the coils that sense different signals and are adjacent to each other may overlap and cross each other. As the first sensing coils RF overlap each other, a crossing point at which the coils cross each other may be defined on the plane. At the crossing point, one of the first sensing coils RF may be connected via the other layer through the above-described contact lines NFB-U and NFB-B.

According to an embodiment, the folding part DTM-F may include a central portion IN overlapping the active area AA and outer portions OM overlapping a peripheral area NAA and spaced apart from each other in the second direction DR2 with the central portion IN therebetween. For convenience of description, one outer portion OM disposed on an upper end of the folding part DTM-F will be mainly described, and the description thereof may also be applied to the outer portion OM disposed on a lower end of the folding part DTM-F.

According to an embodiment, first holes HL-N may be defined in the central portion IN, and second holes HL-T and third holes HL-C may be defined in the outer portion OM. The formation or shape of each of the first holes HL-N, the second holes HL-T, and the third holes HL-C may be different from each other. This will be described later.

FIG. 7B illustrates an example of first and second coils L-1 to L-6 of the first sensing coils RF and connection lines PP connected to the corresponding first to sixth coils L-1 to L-6. Each of the connection lines PP may be any one of the connection lines BR-U1, BR-U2, BR-B1, and BR-B2 described in FIG. 6.

The first to sixth coils L-1 to L-6 may correspond to the long sides disposed on the first and second non-folding parts DTM-1 and DTM-2 of the first sensing coils RF. The connection lines PP may be lines disposed on the folding part DTM-F to connect the first to sixth coils L-1 to L-6 disposed on the first non-folding part DTM-1 to the first to sixth coils L-1 to L-6 disposed on the second non-folding part DTM-2.

Each of the first to sixth coils L-1 to L-6 may extend in the first direction DR1 and may be spaced apart from each other in the second direction DR2. In an embodiment, for example, on the plane, the first and second coils L-1 and L-2 may be disposed adjacent to each other, the third and fourth coils L-3 and L-4 may be disposed adjacent to each other, and the fifth and sixth coils L-5 and L-6 may be disposed adjacent to each other.

A spaced distance between the second coil L-2 and the third coil L-3 in the second direction DR2 may be greater than a spaced distance between the first coil L-1 and the second coil L-2 in the second direction DR2. In addition, a spaced distance between the fourth coil L-4 and the fifth coil L-5 in the second direction DR2 may be greater than a spaced distance between the third coil L-3 and the fourth coil L-4 in the second direction DR2.

In such an embodiment, the first holes HL-N disposed in the central portion IN of the foldable part DTM-F may include first group holes H1 and second group holes H2. In an embodiment, for example, the first group holes H1 may include first holes H1-1 and second first holes H1-2 extending in the second direction DR2 and arranged in the second direction DR2. The second group holes H2 may be spaced apart from the first group holes H1 in the first direction DR1, and each of the second group holes H2 may include a first second hole H2-1, a second hole H2-2, and a third second hole H2-3 extending in the second direction DR2 and arranged in the second direction DR2. Each of the first group holes H1 and the second group holes H2 may be provided in plurality, which are alternately arranged in the first direction DR1 within the folding part DTM-F in the first direction DR1.

In such an embodiment, the second group hole H2 may be shifted by a predetermined distance in the second direction DR2 from the first group hole H1. The shape of the remaining portions of the folding part DTM-F excluding the first holes HL-N may have a slit shape having a lattice pattern.

Each of the connection lines PP may include a first pattern P1-1, a second first pattern P1-2, a second pattern P2, and a third pattern P3.

Each of the first pattern P1-1 and the second first pattern P1-2 may extend in the second direction DR2, and the first pattern P1-1 and the second first pattern P1-2 may be spaced apart from each other in the first direction DR1 with the corresponding one hole HL therebetween. The second pattern P2 may be connected to one end of each of the first pattern P1-1 and second first pattern P1-2 to connect the first pattern P1-1 to the second first pattern P1-2.

One end of the third pattern P3 may be connected to the other end of the second first pattern P1-2, and the other end of the third pattern P3 may be connected to the other end of the first pattern P1-1 of the continuous connection line PP.

A shape of the connection line PP connecting the first coils L-1 to each other and a shape of the connection line PP connecting the second coils L-2 to each other may be symmetrical to each other along an imaginary line extending in the first direction DR1.

According to an embodiment, on the plane, four or less connection lines PP, which are disposed at the central portion IN, may be disposed between the adjacent holes HL in the second direction DR2, and two or less connection lines PP may be disposed between the adjacent holes HL in the first direction DR1.

Referring to FIG. 8A, each of the second sensing coils CF may include long sides extending in the second direction DR2 and short sides extending in the first direction DR1 and connected to corresponding long sides. Most of the long sides may be disposed on an active area AA, and most of the short sides may be disposed on a peripheral area NAA.

According to an embodiment, each of the second sensing coils CF may rotate (or be wound) at least twice to form an open loop, and at least one of one end or the other end may be connected to the connector CT. In the second sensing coils CF, at least a portion of the coils that sense different signals and are adjacent to each other may overlap and cross each other. As the second sensing coils CF overlap each other, a crossing point at which the coils cross each other may be defined on the plane. At the crossing point, one of the second sensing coils CF may be connected via the other layer through the above-described contact lines NFB-U and NFB-B.

FIG. 8B illustrates connection lines C1-1, C1-2, C1-3, C1-4, C2-1, C2-2, C2-3, C2-3, C2-4 disposed at the central portion IN. Each of the connection lines C1-1, C1-2, C1-3, C1-4, C2-1, C2-2, C2-3, and C2-4 may be one of the connection lines BR-U1, BR-U2, BR-B1, and BR-B2, which are described with reference to FIG. 6.

At least one of the connection lines C1-1, C1-2, C1-3, C1-4, C2-1, C2-2, C2-3, and C2-4 may be connected to a portion of the second sensing coils CF disposed on the first non-folding part DTM-1, and the other one of the connection lines C1-1, C1-2, C1-3, C1-4, C2-1, C2-2, C2-3, and C2-4 may be connected to a portion of the second sensing coils CF disposed on the non-folding part DTM-2.

Each of the first group connection lines C1-1, C1-2, C1-3, and C1-4 and the second group connection lines C2-1, C2-2, C2-3, and C2-4 may be disposed between the holes HL extending in the second direction DR2 and adjacent to each other in the first direction DR1. On the plane, the first group connection lines C1-1, C1-2, C1-3, and C1-4 and the second group connection lines C2-1, C2-2, C2-3, and C2-4 may be alternately arranged in the first direction DR1. According to an embodiment, the first group connection lines C1-1, C1-2, C1-3, and C1-4 and the second group connection lines C2-1, C2-2, C2-3, and C2-4 may be disposed on different layers, and a description thereof will be described later.

In the connection lines C1-1, C1-2, C1-3, C1-4, C2-1, and C2-2, C2-3, and C2-4, which are connected to the second sensing coils CF, of the connection lines disposed on the folding part DTM-F, one coil may be disposed between the holes HL adjacent to each other in the first direction DR1.

Figure 9:
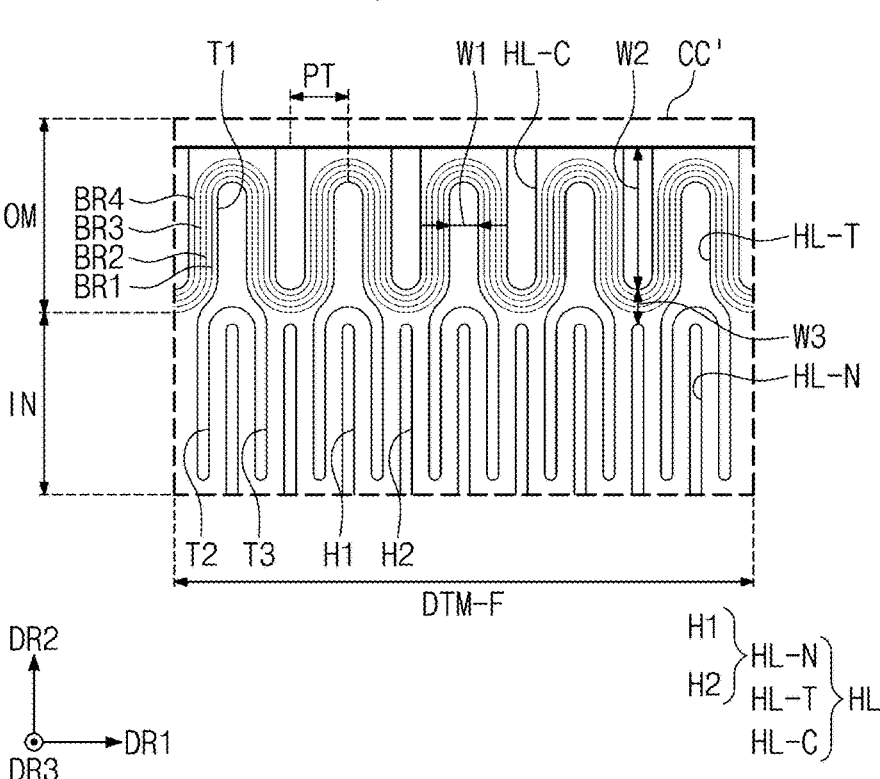
FIG. 9 is an enlarged plan view of an CC' of FIG. 7A.

FIG. 9 is an enlarged plan view of an CC' of FIG. 7A. FIGS. 10 to 13 are plan views illustrating different layers on the area CC' of FIG. 9.

FIG. 9 illustrates the connection lines when the connection lines BR1, BR2, BR3, and B4 disposed on the outer portion OM of the folding part DRM-F are shown on the plane without classifying layers, and FIGS. 10 to 13 illustrates the connection lines when the connection lines BR1, BR2, BR3, and B4, which are respectively disposed on the base layers BG, BU1, and BB1 described in FIG. 6, are shown to be classified for each layer.

Referring to FIG. 9, the folding part DTM-F of the digitizer DTM may include a central portion IN and an outer portion OM. Holes HL may be defined through the folding part DTM-F by extending from the front to the rear.

First holes HL-N may be defined in the central portion IN, and second holes HL-T and third holes HL-C may be defined in the outer portion OM. The formation or shape of each of the first holes HL-N, the second holes HL-T, and the third holes HL-C may be different from each other.

The first holes HL-N may correspond to the first holes HL-N described in FIG. 7B. Each of the first holes HL-N may extend in the second direction DR2, and holes provided in different groups may be alternately arranged and shifted in the second direction DR2.

The second holes HL-T may be spaced apart from each other in the first direction DR1. Each of the second holes HL-T may include a first portion T1, a second portion T2, and a third portion T3. The first portion T1, the second portion T2, and the third portion T3 may be openings that substantially form one hole, but are distinguished for convenience of description.

The first portion T1 may be aligned with the first group hole H1, which is adjacent to the outer portion OM, of the first group holes H1 in the second direction DR2. The second portion T2 may be connected to the first portion T1 and may be disposed at a left side of the first group hole H1. The third portion T3 may be connected to the first portion T1 and may be disposed at a right side of the first group hole H1. Thus, the second portion T2 and the third portion T3 may be spaced apart from each other with the first group hole H1 therebetween.

The third holes HL-C may be aligned with the second group holes H2 in the second direction DR2. Each of the third holes HL-C may be arranged at an edge of the outer portion OM in the first direction DR1 and may have a shape in which a portion thereof is cut. Thus, each of the third holes HL-C may form an opened opening or an opening with an opened side. The second holes HL-T and the third holes HL-C may be alternately arranged in the first direction DR1.

The connection lines BR1, BR2, BR3, and B4 according to an embodiment may be lines that connect the sensing coils disposed on the peripheral area NAA of the first non-folding part DTM-1 to the sensing coils disposed on the peripheral area of the second non-folding part DTM-2 among the first sensing coils RF.

In addition, the connection lines BR1, BR2, BR3, and B4 may be lines which are connected to the sensing coils disposed on the peripheral area NAA of the first non-folding part DTM-1 or connected to the sensing coils disposed on the peripheral area NAA of the first non-folding part DTM-2 among the second sensing coils CF illustrated in FIG. 8A.

According to an embodiment, four connection lines BR1, BR2, BR3, and B4 may be disposed between the second hole HL-T and the third hole HL-C adjacent in the first direction DR1 on the plane. As each of the connection lines BR1, BR2, BR3, and B4 has a curved shape, the connection lines BR1, BR2, BR3, and B4 may be disposed between the second holes HL-T and the third holes HL-C. The first connection line BR1 may be disposed adjacent to the first portion T1 of the second holes HL-T to surround the first portion T1, and the fourth connection line BR4 may be disposed adjacent to the third holes HL-C and be disposed adjacent to the edge of the folding part DTM-F. The second and third connection lines BR2 and BR3 may be disposed between the first connection line BR1 and the fourth connection line BR4.

The connection lines BR1, BR2, BR3, and BR4 may be disposed on the base layers BG, BU1, and BB1, respectively. In an embodiment, for example, four connection lines BR1, BR2, BR3, and BR4 may be disposed on top and bottom surfaces of the base layer BG, a top surface of the first upper base layer BU1, and a bottom surface of the first lower base layer BB1, respectively. Thus, the total number of connection lines BR1, BR2, BR3, and BR4 disposed on the outer portion OM of the folding part DTM-F according to an embodiment may be about 16.

According to an embodiment, a pitch (defined as a distance between centers) of one second hole HL-T and one third hole HL-C, which are adjacent to each other in the first direction DR1, may be greater than or equal to about 1.5 mm and less than or equal to about 2 mm.

A width of the outer portion OM in the first direction DR1 is greater than or equal to about 2 mm and less than or equal to about 5 mm.

The width W1 of the first portion T1 in the first direction DR1 is greater than or equal to about 0.4 mm and less than or equal to about 0.6 mm. A width of each of the first holes HL-N in the first direction DR1 may be less than that of each of the first portion T1 and the second holes HL-C.

A width W2 of each of the third holes HL-C in the second direction DR2 is greater than or equal to about 2 mm and less than or equal to about 3 mm.

A width W3 between the first portions T1 of the first holes HL-N, which are aligned with the third holes HL-C in the second direction DR2, in the first direction DR1 is greater than or equal to about 0.5 mm and less than or equal to about 0.7 mm.

A line width of each of the connection lines BR1, BR2, BR3, and B4 is greater than or equal to about 0.02 mm and less than or equal to about 0.05 mm, and a distance between the adjacent connection lines BR1, BR2, BR3, and B4 is greater than or equal to about 0.02 mm and less than or equal to about 0.05 mm.

Figure 10:
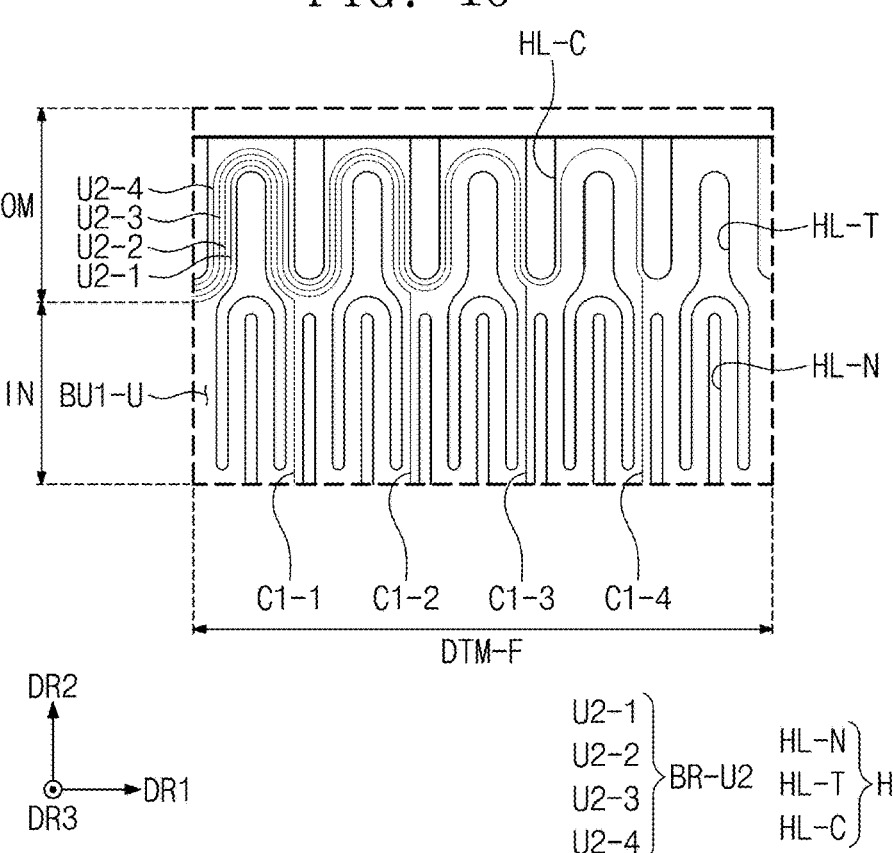
FIGS. 10 to 13 are plan views illustrating different layers on the area CC' of FIG. 9.

FIG. 10 illustrates the second upper connection lines BR-U2 disposed on a top surface BU1-U of the first upper base layer BU1 described in FIG. 6. The second upper connection lines BR-U2 may include first to fourth lines U2-1, U2-2, U2-3, and U2-4.

The first to fourth lines U2-1, U2-2, U2-3, and U2-4 may be lines disposed on the folding part DTM-F among the second sensing coils CF described in FIG. 8A.

The first line U2-1 may include a first portion surrounding 'a' first portions T1 adjacent to a boundary between the second non-folding part DTM-2 and the folding part DTM-F and a first second portion connected to the first portion and disposed between the first group hole H1 and the second ground hole H2, which are adjacent to each other in the first direction DR1. The first second portion may correspond to the first connection line C1-1 described with reference to FIG. 8B.

The second line U2-2 may include a second first portion surrounding 'b' first portions T1 adjacent to the boundary between the second non-folding part DTM-2 and the folding part DTM-F and a second portion connected to the second first portion, spaced apart from the first second portion in the first direction DR1, and disposed between the first group hole H1 and the second ground hole H2, which are adjacent to each other in the first direction DR1. The second portion may correspond to the second first connection line C1-2 described with reference to FIG. 8B.

The third line U2-3 may include a third first portion surrounding 'c' first portions T1 adjacent to a boundary between the second non-folding part DTM-2 and the folding part DTM-F and a third second portion connected to the third first portion, spaced apart from the second portion in the first direction DR1, and disposed between the first group hole H1 and the second ground hole H2, which are adjacent to each other in the first direction DR1. The third second portion may correspond to the third first connection line C1-3 described with reference to FIG. 8B.

The fourth line U2-4 may include a fourth first portion surrounding 'd' first portions T1 adjacent to the boundary between the second non-folding part DTM-2 and the folding part DTM-F and a fourth second portion connected to the fourth first portion, spaced apart from the third second portion in the first direction DR1, and disposed between the first group hole H1 and the second ground hole H2, which are adjacent to each other in the first direction DR1. The fourth second portion may correspond to the fourth first connection line C1-4 described with reference to FIG. 8B.

In such an embodiment, 'a', 'b', 'c', and 'd' may be natural numbers, 'a' may be less than 'b', 'b' may be less than 'c', and 'c' may be less than 'd'.

Therefore, the number of first portion T1 surrounded by the first part provided in each of the first to fourth lines U2-1, U2-2, U2-3, and U2-4 may gradually increase from the first line U2-1 to the fourth line U2-4.

Figure 11:
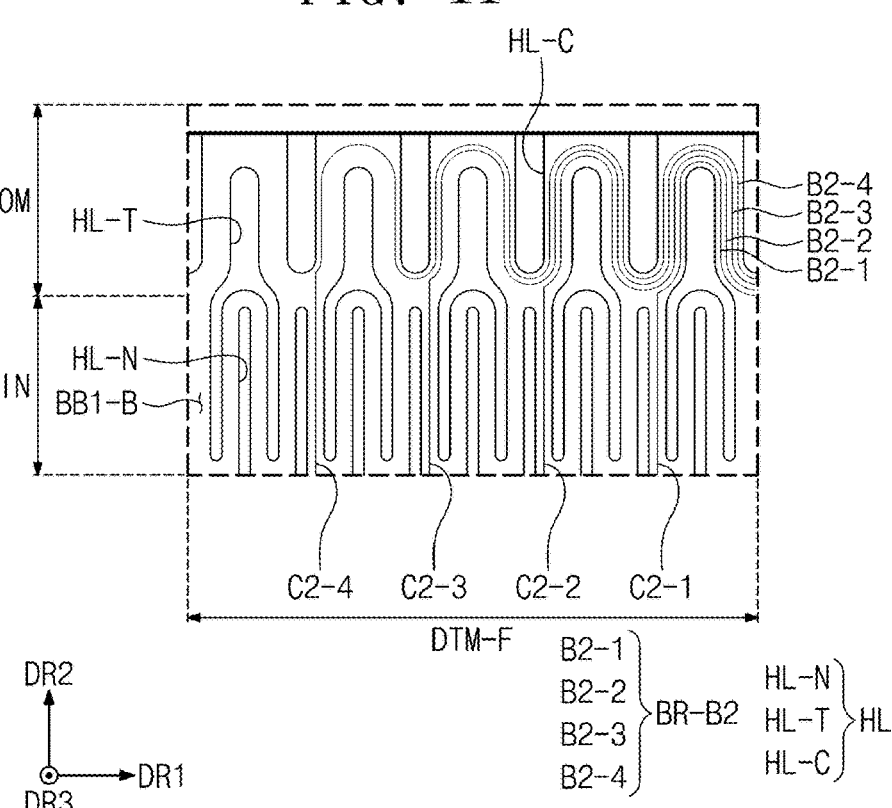

FIG. 11 illustrates the second lower connection lines BR-B2 disposed on a bottom surface BB1-B of the first lower base layer BB1 described in FIG. 6. The second lower connection lines BR-B2 may include fifth to eighth lines B2-1, B2-2, B2-3, and B2-4.

The fifth to eighth lines B2-1, B2-2, B2-3, and B2-4 may be portions disposed on the folding part DTM-F among the second sensing coils CF described with reference to FIG. 8A.

The fifth line B2-1 may include a fifth first portion surrounding 'e' first portions T1 adjacent to a boundary between the first non-folding part DTM-1 and the folding part DTM-F and a fifth second portion connected to the fifth first portion and disposed between the first group hole H1 and the second ground hole H2, which are adjacent to each other in the first direction DR1. The fifth second portion may correspond to the first second connection line C2-1 described with reference to FIG. 8B.

The sixth line B2-2 may include a sixth first portion surrounding 'f' number of first portions T1 adjacent to the boundary between the first non-folding part DTM-1 and the folding part DTM-F and a sixth second portion connected to the sixth first portion, spaced apart from the sixth second portion in the first direction DR1, and disposed between the first group hole H1 and the second ground hole H2, which are adjacent to each other in the first direction DR1. The sixth second portion may correspond to the second connection line C2-2 described with reference to FIG. 8B.

The seventh line B2-3 may include a seventh first portion surrounding 'g' first portions T1 adjacent to the boundary between the first non-folding part DTM-1 and the folding part DTM-F and a seventh second portion connected to the seventh first portion, spaced apart from the sixth second portion in the first direction DR1, and disposed between the first group hole H1 and the second ground hole H2, which are adjacent to each other in the first direction DR1. The seventh second portion may correspond to the third second connection line C2-3 described with reference to FIG. 8B.

The eighth line B2-4 may include an eighth first portion surrounding 'h' number of first portions T1 adjacent to the boundary between the first non-folding part DTM-1 and the folding part DTM-F and an eighth second portion connected to the eighth first portion, spaced apart from the seventh second portion in the first direction DR1, and disposed between the first group hole H1 and the second ground hole H2, which are adjacent to each other in the first direction DR1. The eighth second portion may correspond to the fourth second connection line C2-4 described with reference to FIG. 8B.

In such an embodiment, 'e', 'f', 'g', and 'h' may be natural numbers, 'e' may be less than 'f', 'f' may be less than 'g', and 'g' may be less than that 'h'.

Therefore, the number of first parts T1 surrounded by the first portions provided in each of the fifth to eighth lines B2-1, B2-2, B2-3, and B2-4 may be gradually increase from the fifth line B2-1 to the eighth line B2-4.

According to an embodiment, the second portion provided in the first to fourth lines U2-1, U2-2, U2-3, and U2-4 and the fifth to eighth lines B2-1, B2-2, B2-3, and B2-4 may not overlap each other of the plane and may be alternately arranged in the first direction DR1.

Figure 12:
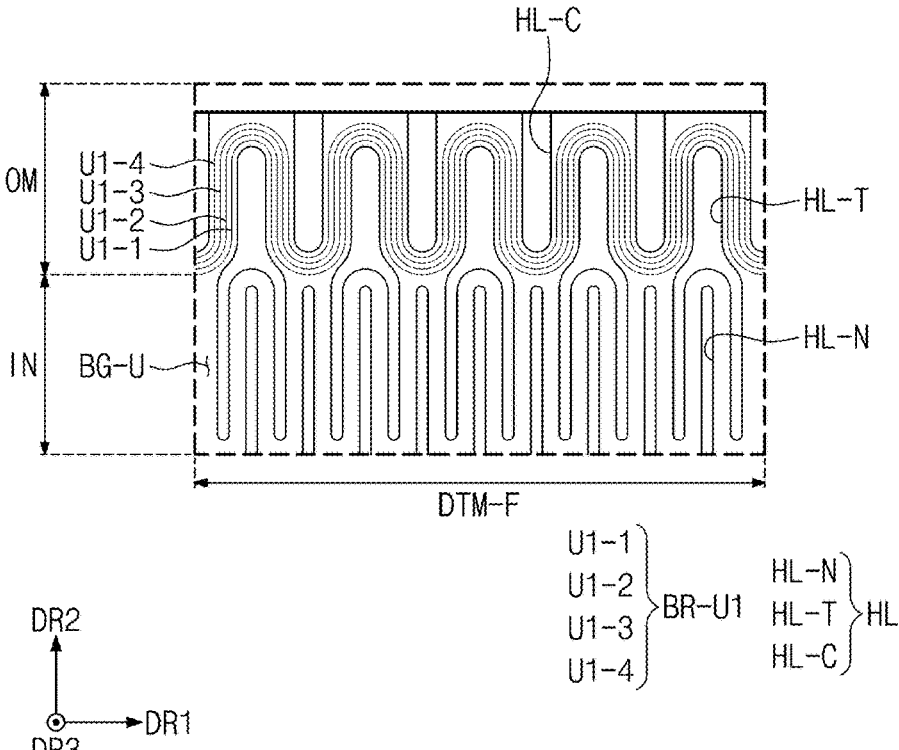

FIG. 12 illustrates the first upper connection lines BR-U1 disposed on a top surface BG-U of the base layer BG described in FIG. 6. The first upper connection lines BR-U1 may include first to fourth lines U1-1, U1-2, U1-3, and U1-4.

The first to fourth lines U1-1, U1-2, U1-3, and U1-4 may be lines connecting the sensing coils to each other, which are spaced apart from each other with the folding part DTM-F therebetween among the first sensing coils RF described in FIG. 7A. However, the embodiment of the invention is not limited thereto, and at least one of the first to fourth lines U1-1, U1-2, U1-3, and U1-4 may be connected to a portion of the second sensing coils CF.

The four first to fourth lines U1-1, U1-2, U1-3, and U1-4 may be disposed between the adjacent second holes HL-T and the third holes HL-C in the first direction DR1 on the plane. As each of the first to fourth lines U1-1, U1-2, U1-3, and U1-4 has a curved shape, the first to fourth lines U1-1, U1-2, U1-3, and U1-4 may be disposed between the second holes HL-T and the third holes HL-C. The first line U1-1 may be disposed adjacent to the first portion T1 of the second holes HL-T to surround the first portion T1, and the fourth line U1-4 may be disposed adjacent to the third holes HL-C and be disposed adjacent to the edge of the folding part DTM-F. The second and third lines U1-2 and U1-3 may be disposed between the first line U1-1 and the fourth line U1-4.

Figure 13:
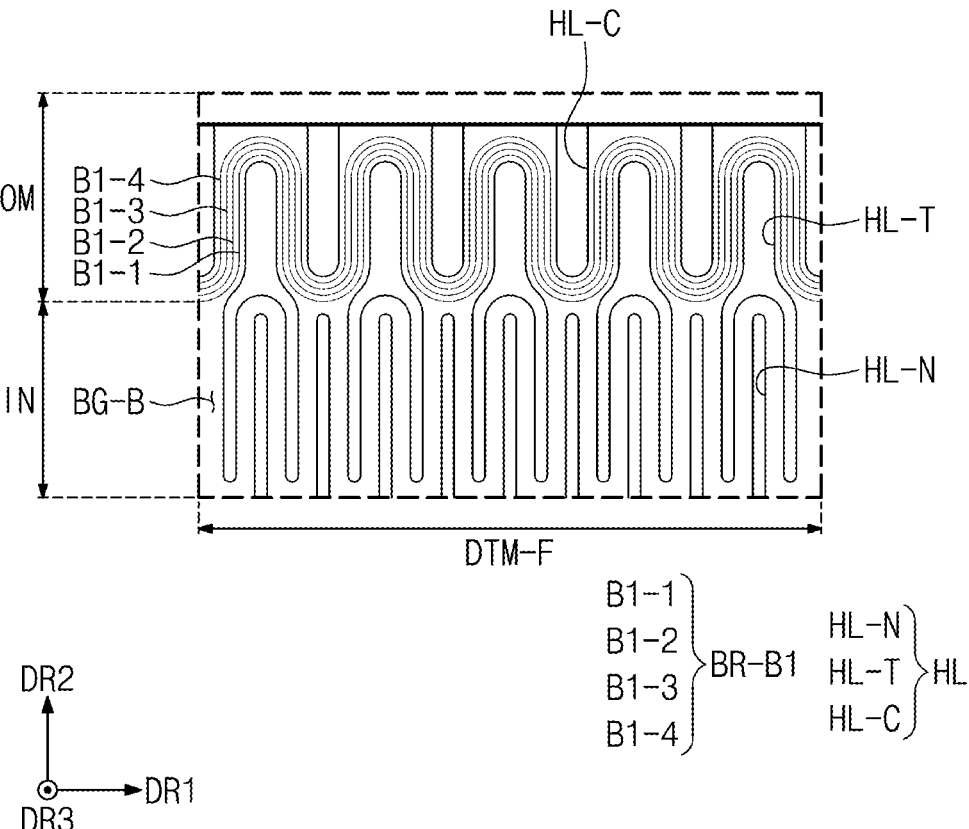

FIG. 13 illustrates the first lower connection lines BR-B1 disposed on a bottom surface BG-B of the base layer BG described in FIG. 6. The first lower connection lines BR-B1 may include first to fourth lines B1-1, B1-2, B1-3, and B1-4.

The first to fourth lines B1-1, B1-2, B1-3, and B1-4 may be lines connecting the sensing coils to each other, which are spaced from each other with the folding part DTM-F, among the first sensing coils RF described in FIG. 7A. However, the embodiment of the invention is not limited thereto, and at least one of the first to fourth lines B1-1, B1-2, B1-3, and B1-4 may be connected to a portion of the second sensing coils CF.

Four first to fourth lines B1-1, B1-2, B1-3, and B1-4 may be disposed between the second and third holes HL-T and HL-C, which are adjacent to each other, in the first direction DR1 on the plane. As each of the first to fourth lines B1-1, B1-2, B1-3, and B1-4 has a curved shape, the first to fourth lines B1-1, B1-2, B1-3, and B1-4 may be disposed between the second holes HL-T and the third holes HL-C. The first line B1-1 may be disposed adjacent to the first portion T1 of the second holes HL-T to surround the first portion T1, and the fourth line B1-4 may be disposed adjacent to the third holes HL-C and be disposed adjacent to the edge of the folding part DTM-F. The second and third lines B1-2 and B1-3 may be disposed between the first line B1-1 and the fourth line B1-4.

According to an embodiment, the first to fourth lines U1-1, U1-2, U1-3, and U1-4 of the first upper connection lines BR-U1 and the first to fourth lines B1-1, B1-2, B1-3, and B1-4 of the first lower connection lines BR-B1 may have shapes corresponding to each other. Thus, the first upper connection lines BR-U1 and the first lower connection lines BR-B1 may overlap each other.

According to embodiments of the invention, in the digitizer DTM including the holes HL in the folding part DTM-F, the connection lines disposed on the outer portion OM of the folding part DTM-F may be disposed in different layers, respectively, to prevent the connection lines from being densely disposed on the folding part DTM-F. In such embodiments, the connection lines connected to the first sensing coils RF and the second sensing coils CF and disposed on the folding part DTM-F may be disposed for each layer to provide the digitizer DTM in which the folding part DTM-F is supplemented in sensing sensitivity.

Figure 14:
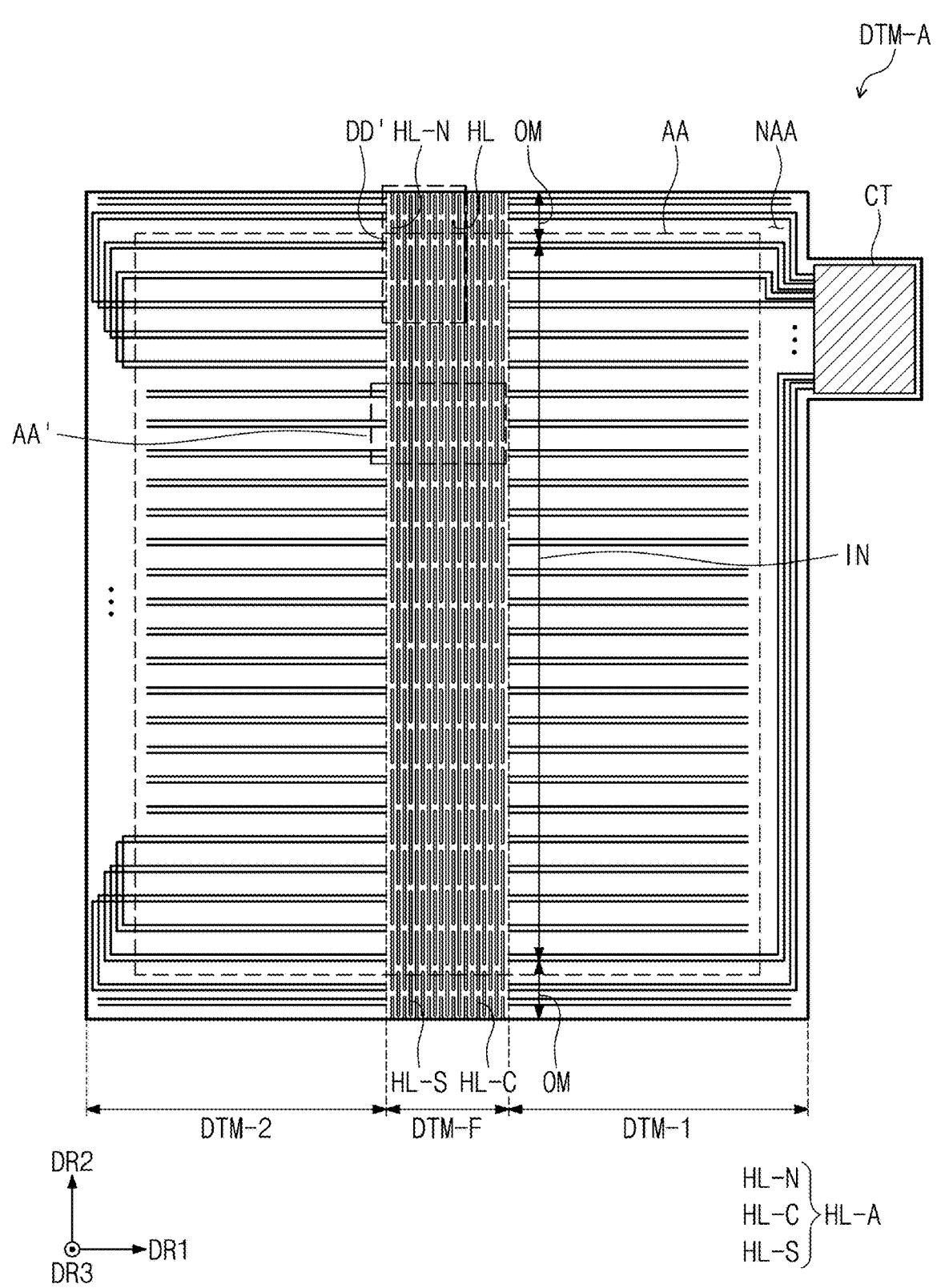
FIG. 14 is a plan view of a digitizer according to an embodiment of the invention.
Figure 15:
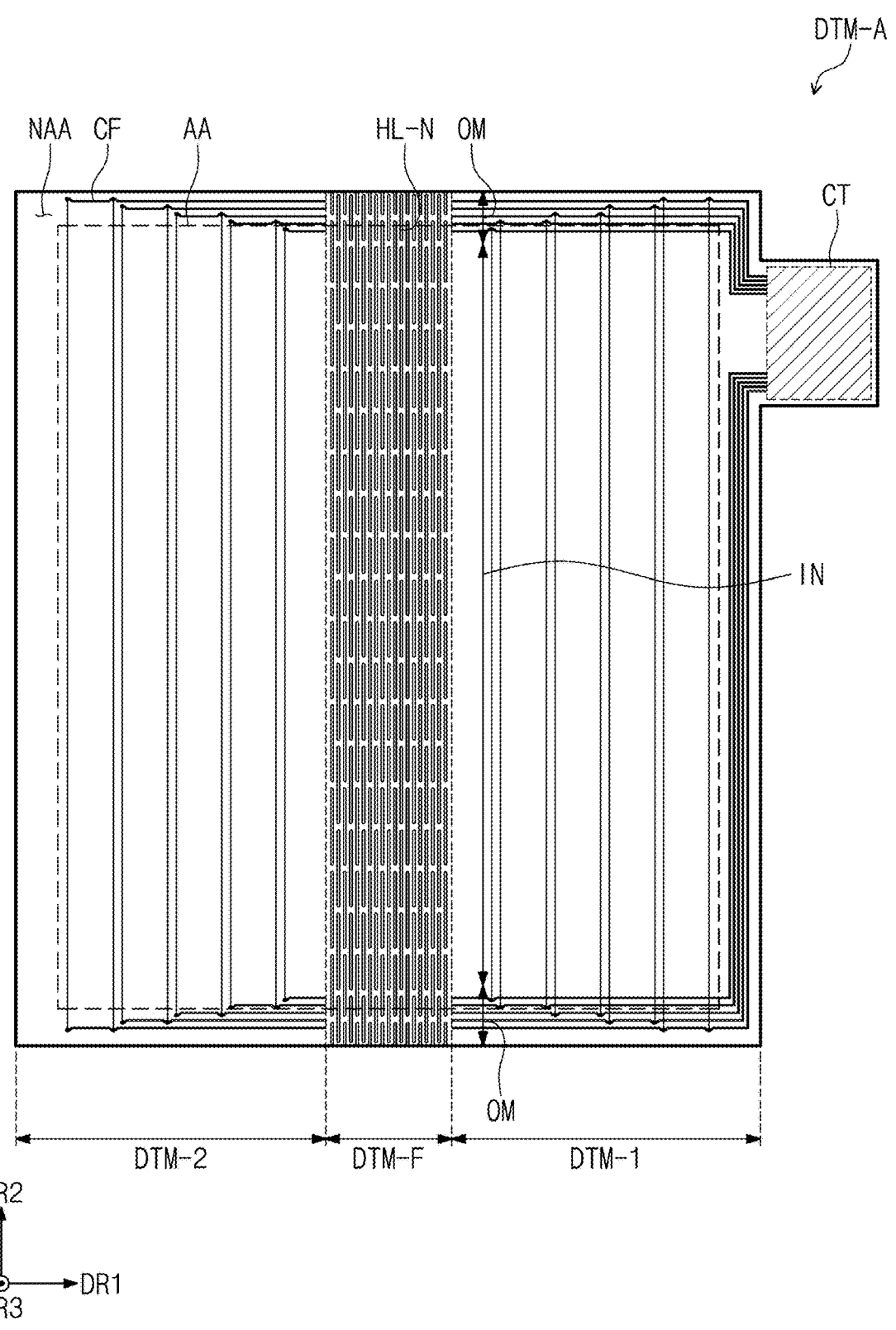
FIG. 15 is a plan view of a digitizer according to an embodiment of the invention.
Figure 16:
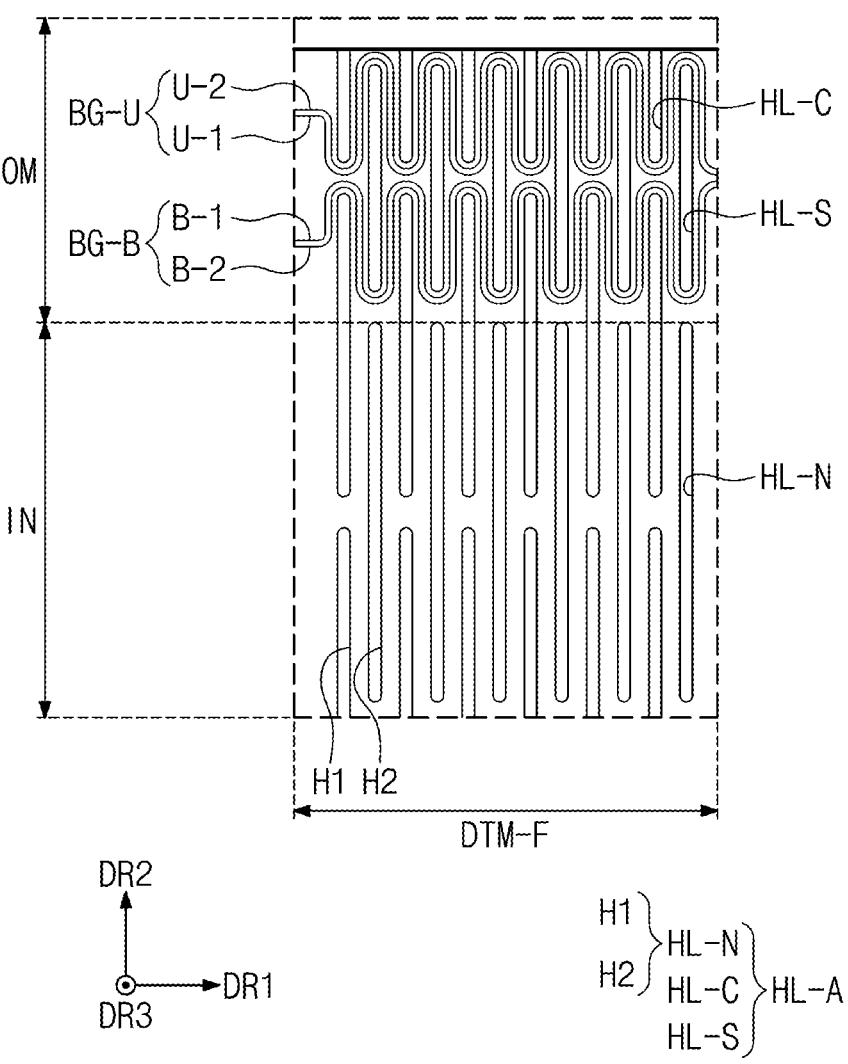
FIG. 16 is an enlarged plan view of an area DD' of FIG. 14.

FIG. 14 is a plan view of the digitizer according to an embodiment of the invention. FIG. 15 is a plan view of the digitizer according to an embodiment of the invention. FIG. 16 is an enlarged plan view of an area DD' of FIG. 14. FIGS. 17 to 20 are plan views illustrating different layers on the area DD' of FIG. 17. The same/similar reference numerals are used for the same/similar configurations as the configurations described above with reference to FIGS. 6 to 13, and any repetitive detailed descriptions thereof will be omitted or simplified.

Referring to FIGS. 14 and 15, a digitizer DTM-A according to an embodiment may include a first non-folding part DTM-1 and a second non-folding part DTM-2, which are arranged in the first direction DR1, and a folding part DTM-F disposed between the first non-folding part DTM-1 and the second non-folding part DTM-2 and provided with holes HL-A defined through the digitizer DTM-A by extending from a top surface to a bottom surface of.

The holes HL-A according to an embodiment may include first holes HL-N, second holes HL-C, and third holes HL-S, which have different shapes from each other.

According to an embodiment, the folding unit DTM-F may include a central portion IN overlapping the active area AA and outer portions OM overlapping a peripheral area NAA and spaced apart from each other in the second direction DR2 with the central portion IN therebetween. For convenience of description, one outer portion OM disposed on an upper end of the folding part DTM-F will be mainly described, and the description thereof may also be applied to the outer portion OM disposed on a lower end of the folding part DTM-F.

Referring to FIG. 14, each of the first sensing coils RF may include long sides extending in the first direction DR1 and short sides extending in the second direction DR2 and connected to corresponding long sides. Most of the long sides may be disposed on an active area AA, and most of the short sides may be disposed on a peripheral area NAA.

According to an embodiment, each of the first sensing coils RF may rotate (or be wound) at least twice to form an open loop, and at least one of one end or the other end may be connected to the connector CT. In the first sensing coils RF, at least a portion of the coils that sense different signals and are adjacent to each other may overlap and cross each other. As the first sensing coils RF overlap each other, a crossing point at which the coils cross each other may be defined on the plane. At the crossing point, one of the first sensing coils RF may be connected via the other layer through the contact lines NFB-U and NFB-B described in FIG. 6.

The sensing coils spaced apart from each other with the first non-folding part DTM-1 and the second non-folding part DTM-2 therebetween among the first sensing coils RF disposed at the central portion IN may correspond to the connection relationship of the connection lines PP described in FIG. 7B.

Referring to FIG. 15, each of the second sensing coils CF may include long sides extending in the second direction DR2 and short sides extending in the first direction DR1 and connected to corresponding long sides. Most of the long sides may be disposed on an active area AA, and most of the short sides may be disposed on a peripheral area NAA.

According to an embodiment, each of the second sensing coils CF may rotate (or be wound) at least twice to form an open loop, and at least one of one end or the other end may be connected to the connector CT. In the second sensing coils CF, at least a portion of the coils that sense different signals and are adjacent to each other may overlap and cross each other. As the second sensing coils CF overlap each other, a crossing point at which the coils cross each other may be defined on the plane. At the crossing point, one of the second sensing coils CF may be connected via the other layer through the contact lines NFB-U and NFB-B described in FIG. 6.

The second sensing coils CF disposed adjacent to the folding part DTM-F among the second sensing coils CF may be connected to the connection lines of the folding part DTM-F to form an open loop. In the second sensing coils CF, the connection relationship between the connection lines disposed on the central portion IN may correspond to a connection relationship of the connection lines C1-1, C1-2, C1-3, C1-4, C2-1, C2-2, C2-3, and C2-4 described in FIG. 8B.

FIG. 16 illustrates the connection lines when the connection lines U-1, U-2, B-1, and B-2 disposed on the outer portion OM of the folding part DRM-F are shown on the plane without classifying layers, and FIGS. 17 to 20 illustrates the connection lines when the connection lines U-1, U-2, B-1, and B-2, which are respectively disposed on the base layers BG, BU1, and BB1 described in FIG. 6, are shown to be classified for each layer.

Referring to FIG. 16, the folding part DTM-F of the digitizer DTM-A according to an embodiment may include first holes HL-N defined in the central portion IN and second holes HL-C and third holes HL-S defined in the outer portion OM.

The first holes HL-N disposed in the central portion IN may include first group holes H1 and second group holes H2. In an embodiment, for example, each of the first group holes H1 may include holes extending in the second direction DR2 and arranged in the second direction DR2. The second group holes H2 may be spaced apart from the first group holes H1 in the first direction DR1, and each of the second group holes H2 may extend in the second direction DR2 and arranged in the second direction DR2. Each of the first group holes H1 and the second group holes H2 may be provided in plurality, which are alternately arranged in the first direction DR1 within the folding part DTM-F in the first direction DR1. According to an embodiment, the holes defined in an upper end of the first group holes H1 may overlap a portion of the outer portion OM.

Each of the second holes HL-C may be aligned with the first group holes H1 in the second direction DR2. Each of the second holes HL-C may be arranged at an edge of the outer portion OM in the first direction DR1 and may have a shape in which a portion thereof is cut. Thus, each of the second holes HL-C may form an opened opening.

The third holes HL-S may be disposed between the adjacent second holes HL-C. The second holes HL-C may be aligned with the second group holes H2 in the second direction DR2. The second holes HL-C and the third holes HL-S may be alternately arranged in the first direction DR1.

According to an embodiment, the first holes HL-N, the second holes HL-C, and the third holes HL-S may have different shapes from each other. Widths of the first holes HL-N, the second holes HL-C, and the third holes HL-S in the first direction DR1 may be the same. The width of each of the first holes HL-N in the second direction DR2 may be greater than that of each of the third holes HL-S, and the width of each of the third holes HL-S in the second direction DR2 may be greater than that of each of the second holes HL-C.

A pitch (defined as a center-to-center distance) of each of the third holes HL-S in the first direction DR1 is greater than or equal to about 0.6 mm and less than or equal to about 1.0 mm.

A width of each of the third holes HL-S in the first direction DR1 is greater than or equal to about 0.1 mm and less than or equal to about 0.2 mm.

A width of each of the third holes HL-S in the second direction DR2 is greater than or equal to about 1.6 mm and less than or equal to about 2.5 mm.

A distance between the first group hole H1 and the third hole HL-S disposed on the outer portion OM in the first direction DR1 is greater than or equal to about 0.15 mm and less than or equal to about 0.3 mm.

A distance between the first group hole H1 and the second hole HL-C disposed on the outer portion OM in the second direction DR2 is greater than or equal to about 0.3 mm and less than or equal to about 0.5 mm.

The digitizer DTM-A may include connection lines U-1, U-2, B-1, and B-2 disposed on the outer portion OM. The connection lines B-1 and B-2 surrounding an upper end of each of the first holes and a lower end of the third holes HL-S, which overlap the outer portion OM among the first holes HL-N may be defined as the lower connection lines BG-B, and the connection lines U-1 and U-2 surrounding an upper end of each of the second holes HL-C and an upper end of each of the third holes HL-S may be defined as upper connection lines BG-U.

Thus, the total number of connection lines U-1, U-2, B-1, and B-2 disposed on the outer portion OM may be four, and the lower connection lines BG-B and the upper connection lines BG-U may be disposed to be curved and symmetrical to each other.

Figure 17:
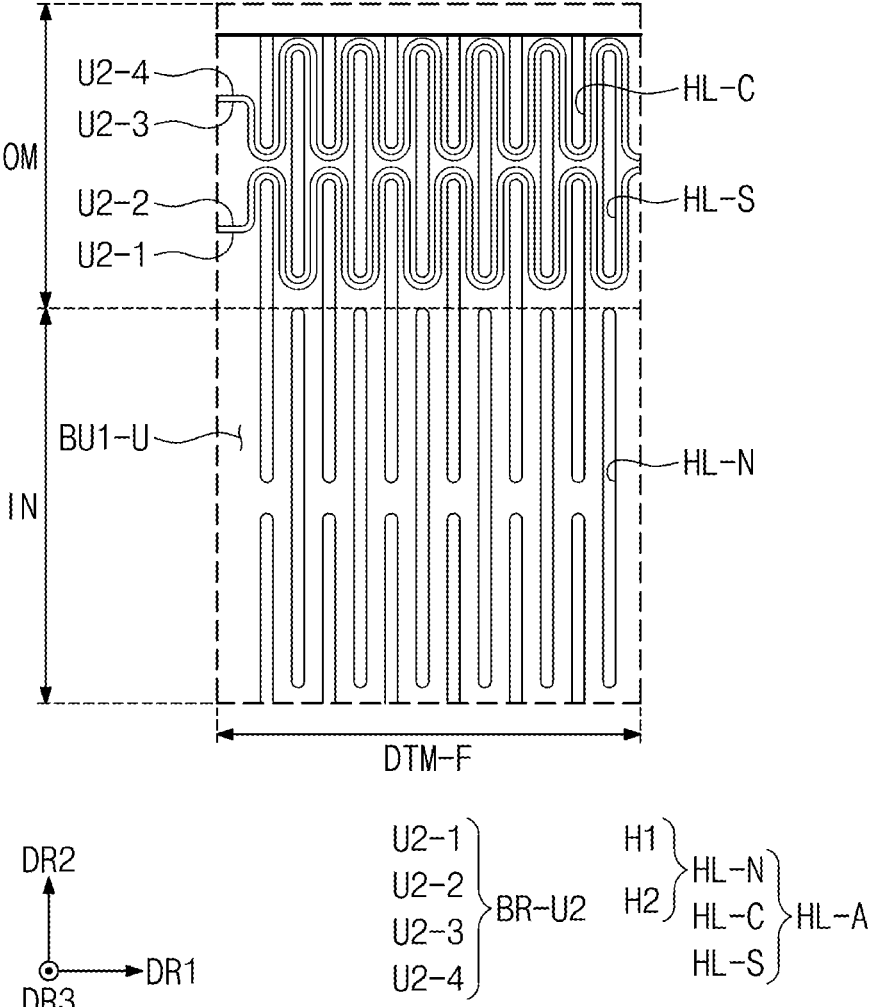
FIGS. 17 to 20 are plan views illustrating different layers on the area DD' of FIG. 17.

FIG. 17 illustrates the second upper connection lines BR-U2 disposed on the top surface BU1-U of the first upper base layer BU1 described in FIG. 6. The second upper connection lines BR-U2 may include first to fourth lines U2-1, U2-2, U2-3, and U2-4. The first line U2-1 and the second line U2-2 may be defined as lower connection lines, and the third line U2-3 and the fourth line U2-4 may be defined as upper connection lines.

The first to fourth lines U2-1, U2-2, U2-3, and U2-4 may be lines connecting the sensing coils to each other, which are spaced apart from each other with the folding part DTM-F therebetween among the first sensing coils RF described in FIG. 7A. However, this embodiment of the invention is not limited thereto, and at least one of the first to fourth lines U2-1, U2-2, U2-3, and U2-4 may be connected to a portion of the second sensing coils CF.

The first line U2-1 and the second line U2-2 may surround upper ends of the first holes and lower ends of the third holes HL-S, which overlap the outer portion OM, among the first holes HL-N. The third line U2-3 and the fourth line U2-4 may surround upper ends of the second holes HL-C and the third holes HL-S, respectively.

Figure 18:
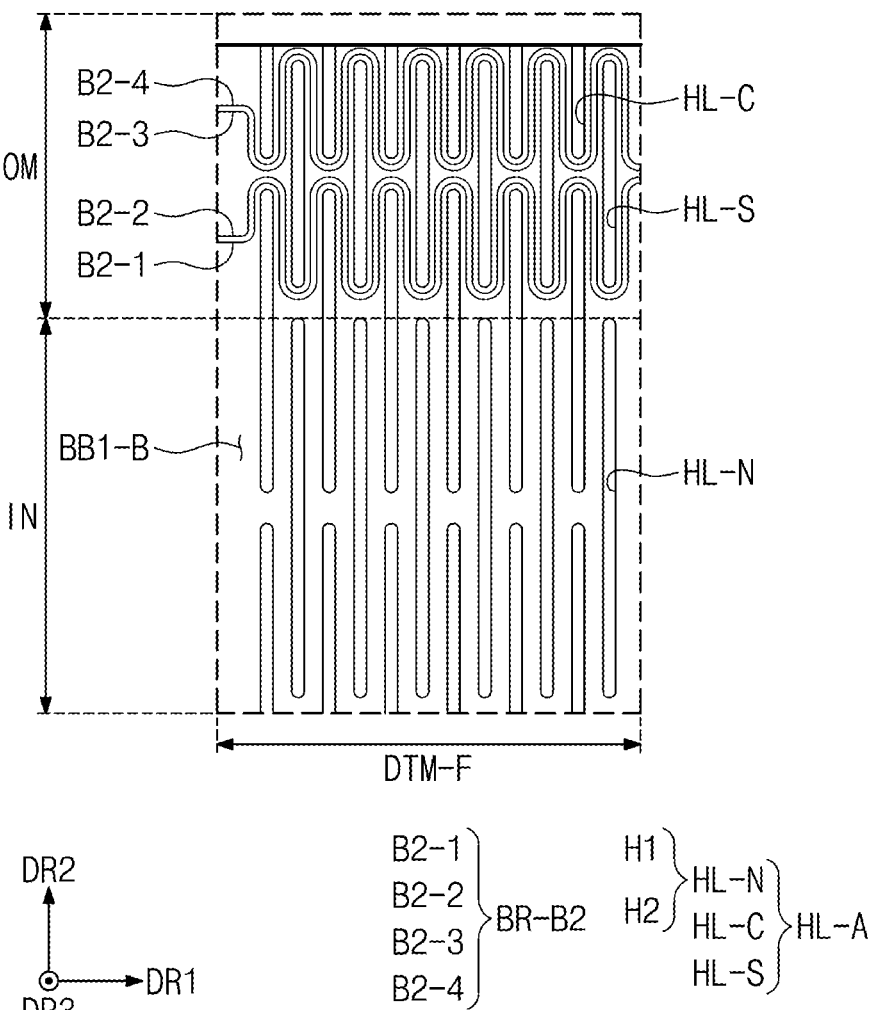

FIG. 18 illustrates the second lower connection lines BR-B2 disposed on the bottom surface BB1-B of the first lower base layer BB1 described in FIG. 6. The second lower connection lines BR-B2 may include first to fourth lines B2-1, B2-2, B2-3, and B2-4. The first line B2-1 and the second line B2-2 may be defined as lower connection lines, and the third line B2-3 and the fourth line B2-4 may be defined as upper connection lines.

The first to fourth lines B2-1, B2-2, B2-3, and B2-4 may be lines connecting the sensing coils to each other, which are spaced from each other with the folding part DTM-F, among the first sensing coils RF described in FIG. 7A. However, the embodiment of the invention is not limited thereto, and at least one of the first to fourth lines B2-1, B2-2, B2-3, and B2-4 may be connected to a portion of the second sensing coils CF.

The first line B2-1 and the second line B2-2 may surround upper ends of the first holes and lower ends of the third holes HL-S, which overlap the outer portion OM, among the first holes HL-N. The third line B2-3 and the fourth line B2-4 may surround upper ends of the second holes HL-C and the third holes HL-S, respectively.

According to an embodiment, the first to fourth lines U2-1, U2-2, U2-3, and U2-4 of the second upper connection lines BR-U2 and the first to fourth lines B2-1, B2-2, B2-3, and B2-4 of the second lower connection lines BR-B2 may overlap each other.

Figure 19:
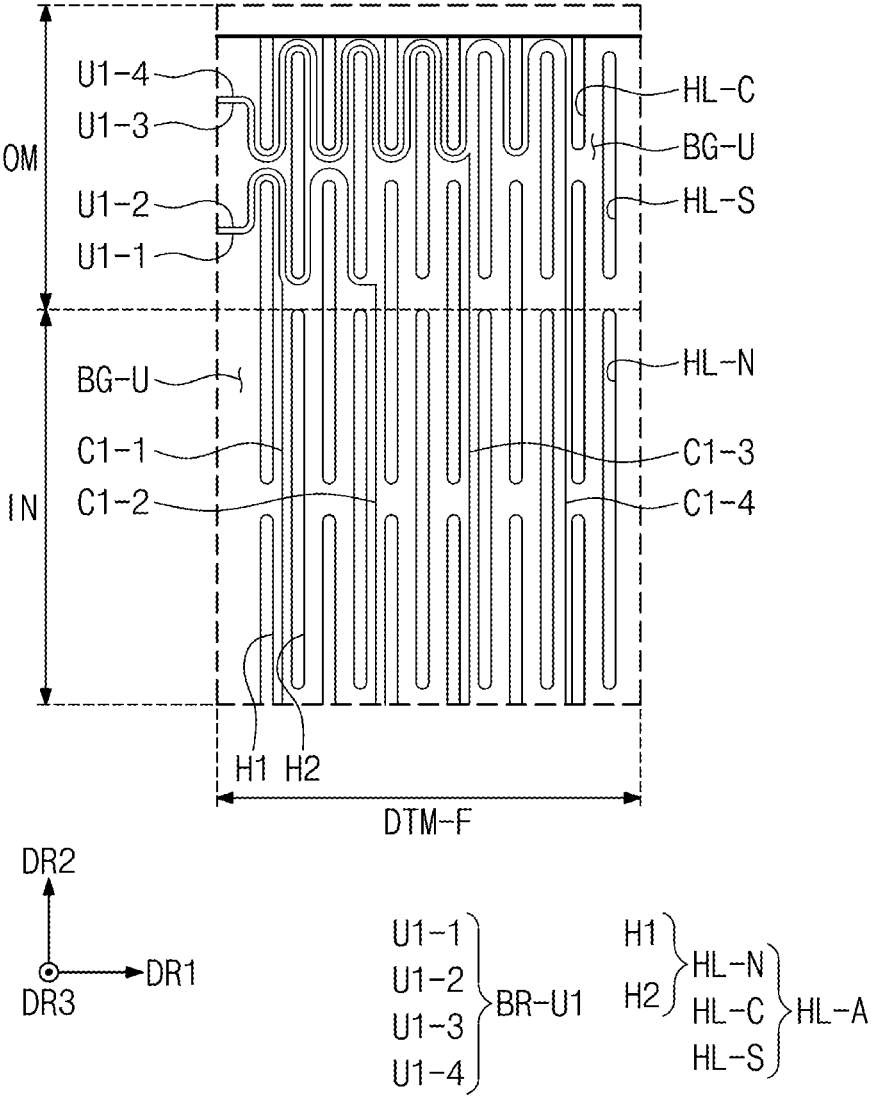

FIG. 19 illustrates the first upper connection lines BR-U1 disposed on the top surface BG-U of the base layer BG described in FIG. 6. The first upper connection lines BR-U1 may include first to fourth lines U1-1, U1-2, U1-3, and U1-4. The first and second lines U1-1 and U1-2 may be defined as lower connection lines, and the third and fourth lines U1-3 and U1-4 may be defined as upper connection lines. The first to fourth lines U1-1, U1-2, U1-3, and U1-4 may be lines disposed on the folding part DTM-F among the second sensing coils CF described in FIG. 8A.

The first line U1-1 of the lower connection lines may include a first portion surrounding a lower end of each of a third holes HL-S adjacent to the boundary between the second non-folding part DTM-2 and the folding part DTM-F and a first second portion connected to the first portion and disposed between the first group hole H1 and the second ground hole H2, which are adjacent to each other in the first direction DR1. The first second portion may correspond to the first connection line C1-1 described with reference to FIG. 8B.

The second line U1-2 of the lower connection lines may include a second first portion disposed on the outer portion OM and surrounding a lower end of each of 'b' third holes HL-S adjacent to the boundary between second non-folding part DTM-2 and the folding part DTM-F and a second portion connected to the second first portion and disposed between the first group hole H1 and the second ground hole H2, which are adjacent to each other in the first direction DR1. The second portion may correspond to the second first connection line C1-2 described with reference to FIG. 8B.

The third line U1-3 of the upper connection lines may include a third first portion disposed on the outer portion OM and surrounding an upper end of each of 'a' third holes HL-S and a third second portion connected to the third first portion, spaced apart from the second portion in the first direction DR1, and disposed between the first group hole H1 and the second ground hole H2, which are adjacent to each other in the first direction DR1. The second portion may correspond to the third first connection line C1-3 described with reference to FIG. 8B.

The fourth line U1-4 of the upper connection lines may include a fourth first portion disposed on the outer portion OM and surrounding an upper end of each of the 'b' third holes HL-S and a fourth second portion connected to the fourth first portion, spaced apart from the third second portion in the first direction DR1, and disposed between the first group hole H1 and the second ground hole H2, which are adjacent to each other in the first direction DR1. The fourth second portion may correspond to the fourth first connection line C1-4 described with reference to FIG. 8B. In such an embodiment, 'a' and 'b' are natural numbers, and 'a' may be less than 'b'.

Figure 20:
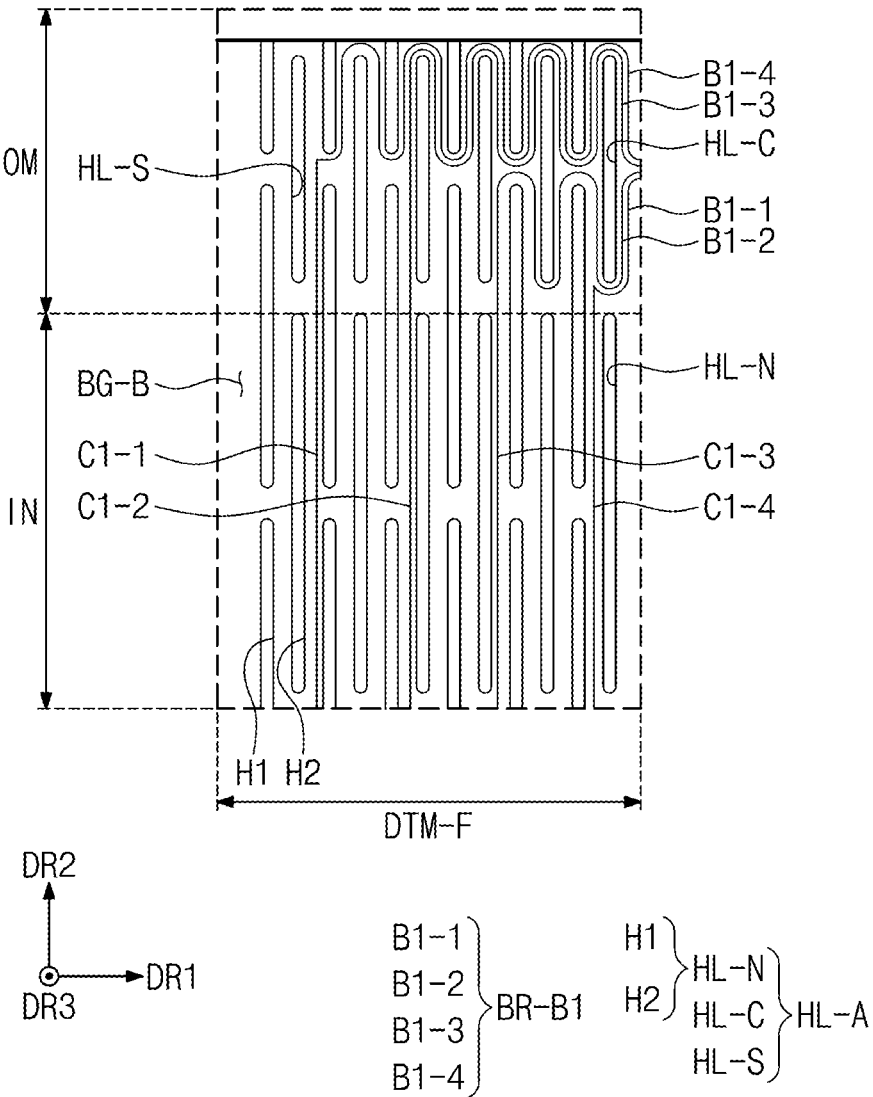

FIG. 20 illustrates the first lower connection lines BR-B1 disposed on the bottom surface BG-B of the base layer BG described in FIG. 6. The first lower connection lines BR-B1 may include fifth to eighth lines B1-1, B1-2, B1-3, and B1-4. The fifth and sixth lines B1-1 and B1-2 may be defined as lower connection lines, and the seventh and eighth lines B1-3 and B1-4 may be defined as upper connection lines. The fifth to eighth lines B1-1, B1-2, B1-3, and B1-4 may be lines disposed on the folding part DTM-F among the second sensing coils CF described with reference to FIG. 8A.

The fifth line B1-1 of the lower connection lines may include a first first portion surrounding a lower end of each of 'c' third holes HL-S adjacent to the boundary between the second non-folding part DTM-2 and the folding part DTM-F and a first second portion connected to the first portion and disposed between the first group hole H1 and the second ground hole H2, which are adjacent to each other in the first direction DR1. The first second portion may correspond to the first second connection line C2-1 described with reference to FIG. 8B.

The second line B1-2 of the lower connection lines may include a second first portion surrounding a lower end of each of 'd' third holes HL-S adjacent to the boundary between second non-folding part DTM-2 and the folding part DTM-F and a second portion connected to the second first portion and disposed between the first group hole H1 and the second ground hole H2, which are adjacent to each other in the first direction DR1. The second portion may correspond to the second connection line C2-2 described with reference to FIG. 8B.

The third line B1-3 of the upper connection lines may include a third first portion surrounding an upper end of each of 'c' third holes HL-S and a third second portion connected to the third first portion, spaced apart from the second portion in the first direction DR1, and disposed between the first group hole H1 and the second ground hole H2, which are adjacent to each other in the first direction DR1. The second portion may correspond to the third second connection line C2-3 described with reference to FIG. 8B.

The third line U1-4 of the upper connection lines may include a fourth first portion surrounding an upper end of each of 'd' third holes HL-S and a fourth second portion connected to the fourth first portion, spaced apart from the third second portion in the first direction DR1, and disposed between the first group hole H1 and the second ground hole H2, which are adjacent to each other in the first direction DR1. The fourth second portion may correspond to the fourth second connection line C2-4 described with reference to FIG. 8B. In such an embodiment, 'c' and 'd' are natural numbers, and 'c' may be less than 'd'.

Figure 21:
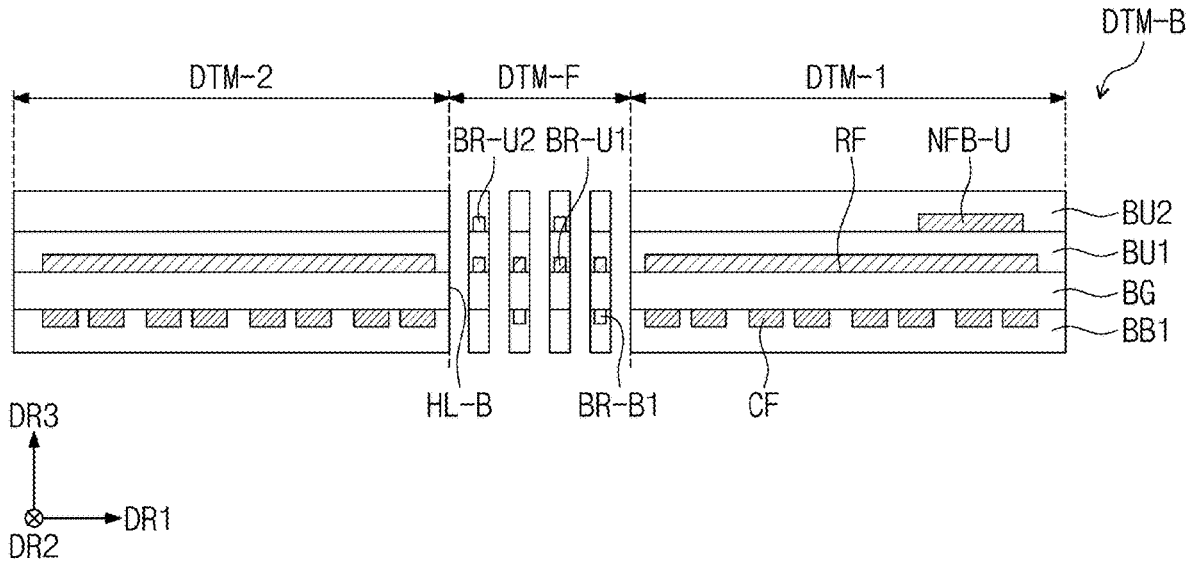
FIG. 21 is a cross-sectional view of a digitizer according to an embodiment of the invention.
Figure 22:
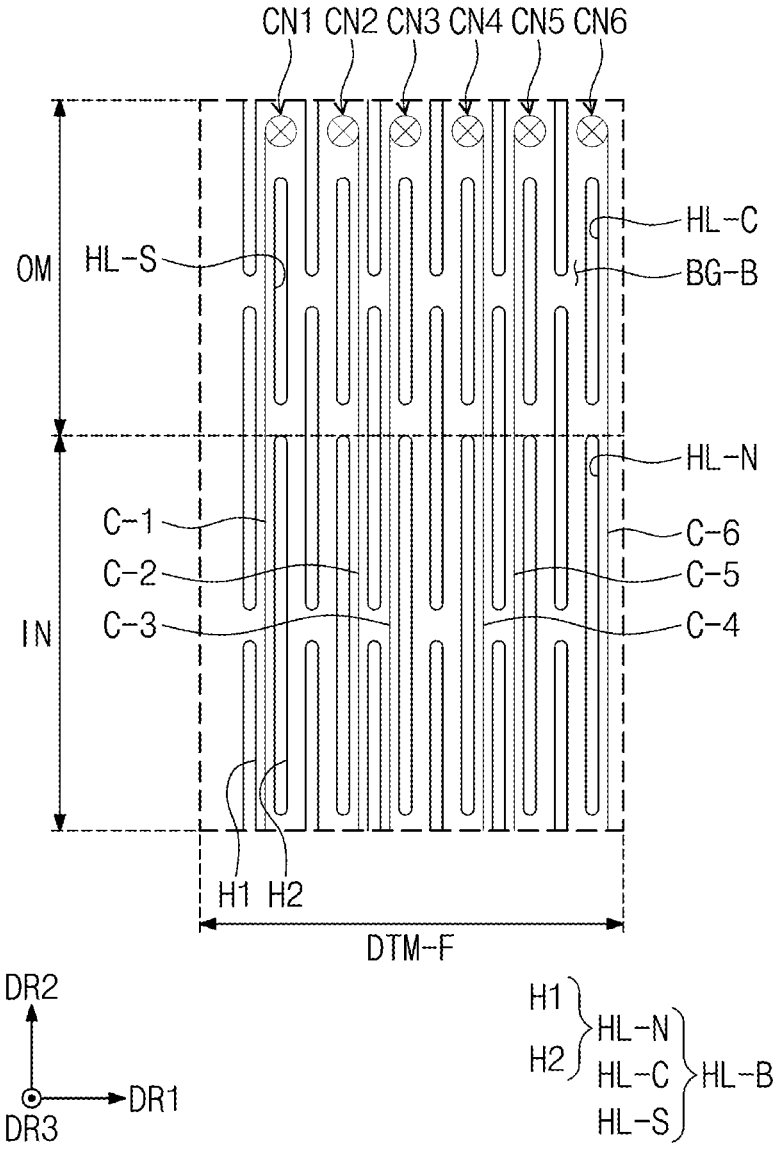
FIG. 22 is an enlarged view illustrating a folding part of the digitizer according to an embodiment of the invention.
Figure 23:
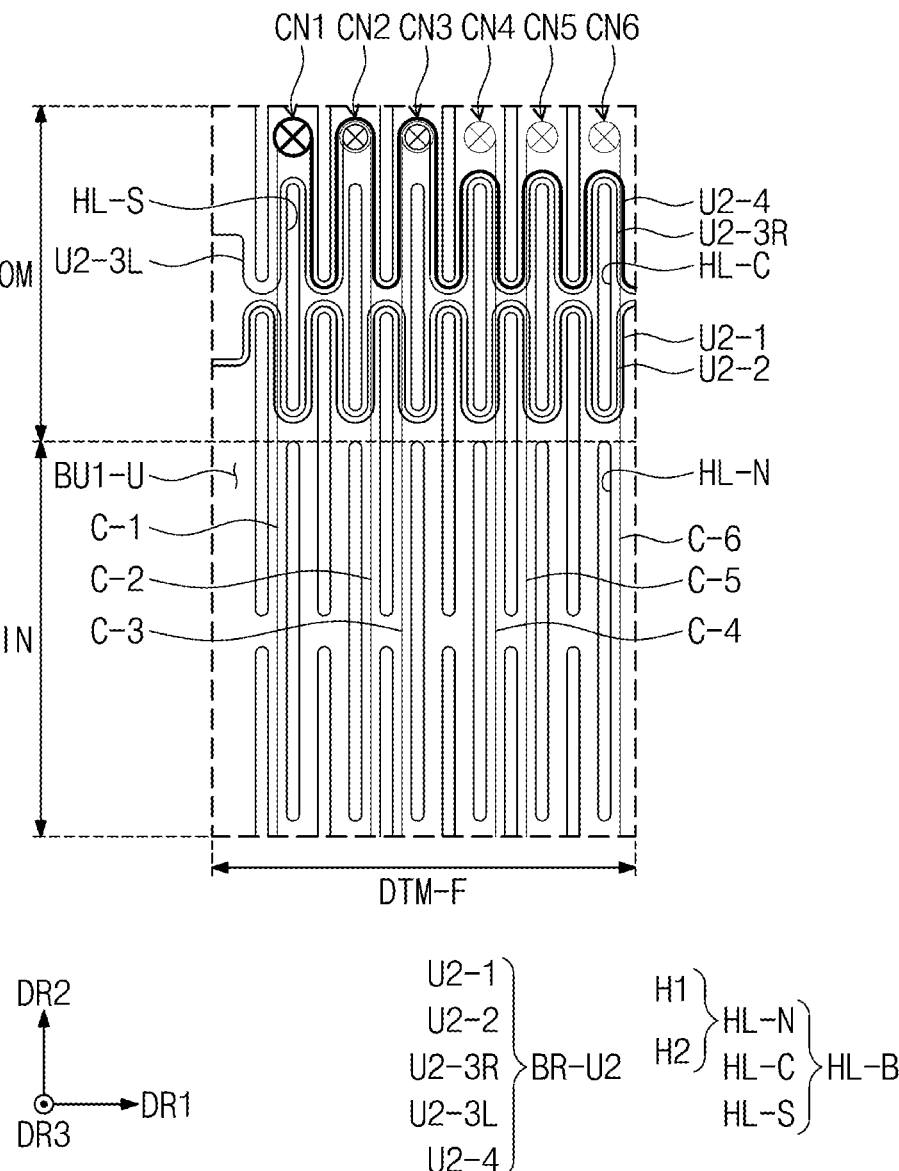
FIG. 23 is an enlarged view illustrating a folding part of the digitizer according to an embodiment of the invention.
Figure 24:
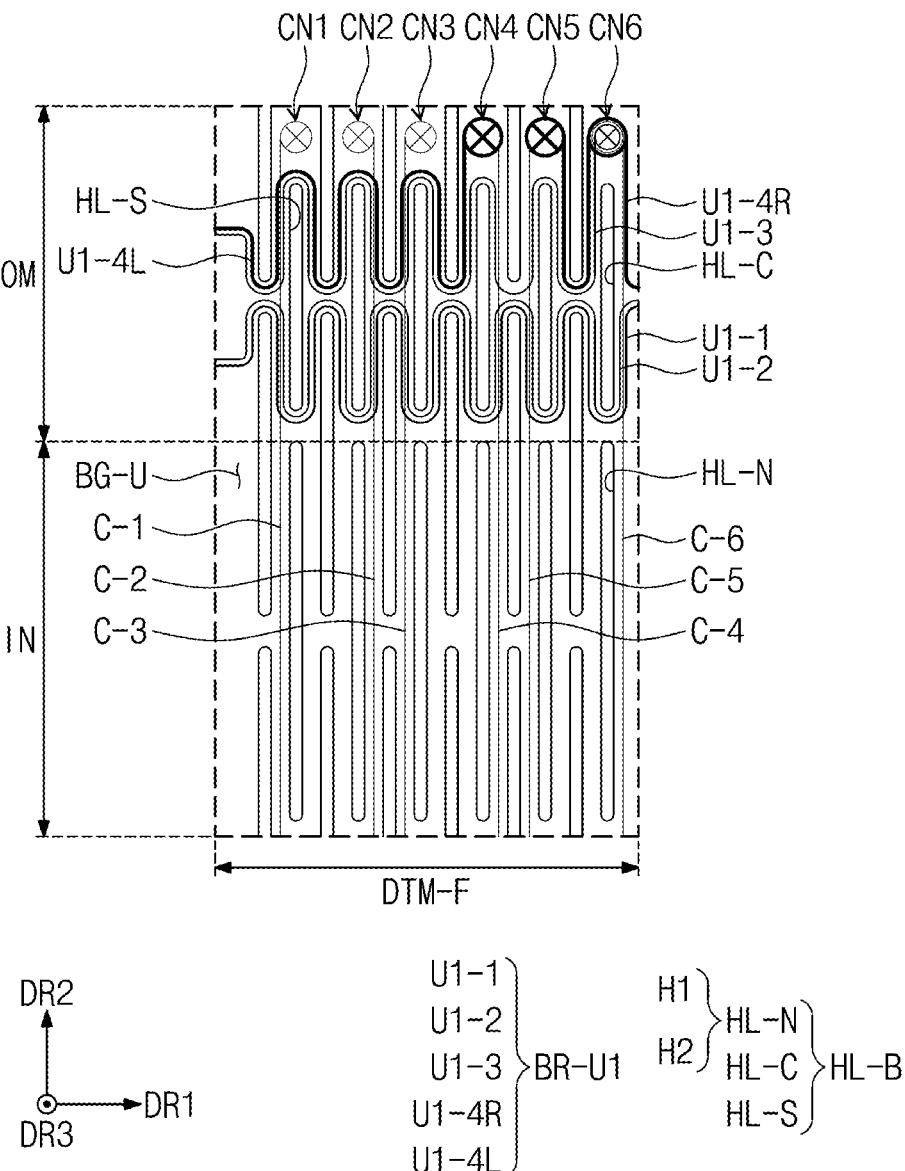
FIG. 24 is an enlarged view illustrating a folding part of the digitizer according to an embodiment of the invention.

FIG. 21 is a cross-sectional view of a digitizer according to an embodiment of the invention. FIG. 22 is an enlarged view illustrating a folding part of the digitizer according to an embodiment of the invention. FIG. 23 is an enlarged view illustrating a folding part of the digitizer according to an embodiment of the invention. FIG. 24 is an enlarged view illustrating a folding part of the digitizer according to an embodiment of the invention. The same/similar reference numerals are used for the same/similar configurations as the configurations described above with reference to FIGS. 6 to 20, and any repetitive detailed descriptions thereof will be omitted or simplified.

Referring to FIG. 21, the digitizer DTM-B according to an embodiment may include a plurality of base layers BG, BU1, BU2, and BB1, first sensing coils RF, second sensing coils CF, and connection lines BR-U1, BR-U2, and BR-B1.

Each of the first sensing coils RF and the second sensing coils CF may be insulated from each other to form an open loop. Some of the first sense coils RF may overlap each other on the plane, and the overlapping portions may be connected to each other through contact lines NFB-U via difference layers. In an embodiment, for example, some of the first sense coils RF may be connected to the upper contact lines NFB-U disposed on the first upper base layer BU1.

Some of the second sense coils CF may overlap each other on the plane, and the overlapping portions may be connected to each other through contact lines NFB-U via difference layers. In an embodiment, for example, some of the second sense coils CF may be connected to the upper contact lines NFB-U disposed on the first upper base layer BU1.

Each of the base layers BG, BU1, BU2, and BB1 may include a matrix including a filler and woven fiber lines disposed inside the matrix. Each of the fiber lines may be provided in a bundle form in which a plurality of fibers are gathered. A diameter of one fiber provided in one fiber line may be greater than or equal to about 3 $\mu$m and less than or equal to about 10 $\mu$m.

Each of the fiber lines may include a reinforced fiber composite. The reinforced fiber composite may be any one of carbon fiber-reinforced plastic (CFRP) and glass fiber-reinforced plastic (GFRP). The fiber lines may be disposed inside the matrix.

According to an embodiment, the base layer BG may include polyimide, and each of the remaining base layers BU1, BU2, and BB1 may include a reinforced fiber composite material.

The folding part DTM-F of the digitizer DTM-B according to an embodiment may be provided with holes HL-B defined through the folding part DTM-F by extending from a top surface to a bottom surface of the folding part DTM-F. The holes HL-B may include first holes HL-N, second holes HL-C, and third holes HL-S, which have different shapes from each other.

The first holes HL-N disposed in the central portion IN may include first group holes H1 and second group holes H2. In an embodiment, for example, each of the first group holes H1 may include holes extending in the second direction DR2 and arranged in the second direction DR2. The second group holes H2 may be spaced apart from the first group holes H1 in the first direction DR1, and each of the second group holes H2 may extend in the second direction DR2 and arranged in the second direction DR2. Each of the first group holes H1 and the second group holes H2 may be provided in plurality, which are alternately arranged in the first direction DR1 within the folding part DTM-F in the first direction DR1. According to an embodiment, the holes defined in an upper end of the first group holes H1 may overlap a portion of the outer portion OM.

Each of the second holes HL-C may be aligned with the first group holes H1 in the second direction DR2. Each of the second holes HL-C may be arranged at an edge of the outer portion OM in the first direction DR1 and may have a shape in which a portion thereof is cut. Thus, each of the second holes HL-C may form an opened opening.

The third holes HL-S may be disposed between the adjacent second holes HL-C. The second holes HL-C may be aligned with the second group holes H2 in the second direction DR2. The second holes HL-C and the third holes HL-S may be alternately arranged in the first direction DR1.

According to an embodiment, the first holes HL-N, the second holes HL-C, and the third holes HL-S may have different shapes from each other. Widths of the first holes HL-N, the second holes HL-C, and the third holes HL-S in the first direction DR1 may be the same as each other. The width of each of the first holes HL-N in the second direction DR2 may be greater than that of each of the third holes HL-S, and the width of each of the third holes HL-S in the second direction DR2 may be greater than that of each of the second holes HL-C.

The arrangement shape of the first and second sensing coils RF and CF provided in the digitizer DTM-B on the plane may correspond to the arrangement shape of the first and second sensing coils RF and CF provided in the digitizer DTM-A described with reference to FIGS. 14 and 15. Therefore, a difference therebetween will be mainly described.

FIG. 22 illustrates lower connection lines C-1, C-2, C-3, C-4, C-5, and C-6 disposed on a bottom surface BG-B of the base layer BG described in FIG. 6. Each of the lower connection lines C-1, C-2, C-3, C-4, C-5, and C-6 may extend in the second direction DR2, may be spaced apart from each other in the first direction DR1, and may be disposed between first group holes H1 and second group holes H2, which are different from each other. In such an embodiment, the lower connection lines C-1, C-2, C-3, C-4, C-5, and C-6 may overlap the outer portion OM and the central portion IN. The lower connection lines C-1, C-2, C-3, C-4, C-5, and C-6 may be connected to the second sensing coil CF.

The folding part DTM-F of the digitizer DTM-B according to an embodiment may include a central portion IN and an outer portion OM. The outer portion OM may include contact holes CN1 to CN6 defined through at least one of the base layer BG and the first upper base layer BU1.

A portion of the first connection line C-1 may overlap the first contact hole CN1 and may be exposed by the first contact hole CN1. A portion of the second connection line C-2 may overlap the second contact hole CN2 and may be exposed by the second contact hole CN2. A portion of the third connection line C-3 may overlap the third contact hole CN3 and may be exposed by the third contact hole CN3. A portion of the fourth connection line C-4 may overlap the fourth contact hole CN4 and may be exposed by the fourth contact hole CN4. A portion of the fifth connection line C-5 may overlap the fifth contact hole CN5 and may be exposed by the fifth contact hole CN5. A portion of the sixth connection line C-6 may overlap the sixth contact hole CN6 and may be exposed by the sixth contact hole CN6.

FIG. 17 illustrates an embodiment where the second upper connection lines BR-U2 are disposed on the top surface BU1-U of the first upper base layer BU1 shown in FIG. 6. FIG. 23 illustrates an embodiment where lower connection lines C-1, C-2, C-3, C-4, C-5, and C-6 are disposed on the lower surface BG-B of the base layer BG shown in FIG. 21 as a slid line to show the connection relationship therebetween. The second upper connection lines BR-U2 may include first to fourth lines U2-1, U2-2, U2-3L, U2-3R, and U2-4.

The first and second lines U2-1 and U2-2 of the first to fourth lines U2-1, U2-2, U2-3L, U2-3R, and U2-4 may be connected to the first sensing coils RF. The third and fourth sensing coils U2-3L, U2-3R, and U2-4 may be connected to the second sensing coils CF.

Each of the first and second lines U2-1 and U2-2 may have a curve and surround lower ends of the first holes HL-N and the third holes HL-S, which overlap the outer portion OM.

The third lines U2-3L and U2-3R may include a first third line U2-3L and a second third line U2-3R.

The first third line U2-3L may surround the second hole HL-C and the third hole HL-S and overlap the second contact hole CN2. The first third line U2-3L may be connected to the second connection line C-2 exposed through the second contact hole CN2. Thus, the first third line U2-3L may be connected to the second sensing coils CF.

The second third line U2-3R may surround the second holes HL-C and the third holes HL-S and overlap the third contact hole CN3. The 3-2 line U2-3R may be connected to the third connection line C-3 exposed through the third contact hole CN3. Thus, the second third line U2-3R may be connected to the second sensing coils CF.

The fourth line U2-4 may surround the second holes HL-C and the third holes HL-S and overlap the first contact hole CN1. The fourth line U2-4 may be connected to the first connection line C-1 exposed through the first contact hole CN1. Thus, the fourth line U2-4 may be connected to the second sensing coils CF.

FIG. 24 illustrates an embodiment where the second upper connection lines BR-U1 are disposed on the top surface BG-U of the base layer BG. FIG. 24 illustrates lower connection lines C-1, C-2, C-3, C-4, C-5, and C-6 disposed on the lower surface BG-B of the base layer BG shown in FIG. 21 as a slid line to show the connection relationship therebetween. The first upper connection lines BR-U1 may include first to fourth lines U1-1, U1-2, U1-3, U1-4L, and U1-4R.

The first and second lines U1-1 and U1-2 of the first to fourth lines U1-1, U1-2, U1-3, U1-4L, and U1-4R may be connected to the first sensing coils RF. The third and fourth sensing coils U1-3, U1-4L, and U1-4R may be connected to the second sensing coils CF.

Each of the first and second lines U1-1 and U1-2 may have a curve and surround lower ends of the first holes HL-N and the third holes HL-S, which overlap the outer portion OM.

The third line U1-3 may surround the second holes HL-C and the third holes HL-S and overlap the sixth contact hole CN6. The third line U1-3 may be connected to the sixth connection line C-6 exposed through the sixth contact hole CN6. Thus, the third line U1-3 may be connected to the second sensing coils CF.

The fourth lines U1-4L and U1-4R may include a first fourth line U1-4L and a second fourth line U1-4R.

The first fourth line U1-4L may surround the second hole HL-C and the third hole HL-S and overlap the fourth contact hole CN4. The first fourth line U1-4L may be connected to the fourth connection line C-4 exposed through the fourth contact hole CN4. Thus, the first fourth line U1-4L may be connected to the second sensing coils CF.

The second fourth line U1-4R may surround the second holes HL-C and the third holes HL-S and overlap the fifth contact hole CN5. The second fourth line U1-4R may be connected to the fifth connection line C-5 exposed through the fifth contact hole CN5. Thus, the second fourth line U1-4R may be connected to the second sensing coils CF.

As the digitizer DTM-B according to an embodiment is provided with the contact holes in the folding part DTM-F, the lines disposed on the folding part may be effectively prevented from being dense to provide the electronic apparatus including the slimmer digitizer DTM-B.

According to embodiments of the present disclosure, in the digitizer including the holes in the folding part, the connection lines disposed outside the folding part may be disposed in different layers, respectively, to prevent the connection lines from being densely disposed in the folding part.

In such embodiments, the connection lines connected to the sensing coils and disposed in the folding part may be disposed for each layer to provide the digitizer in which the sensing sensitivity of the folding part is supplemented.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic apparatus comprising:

a display module comprising an active area, on which an image is displayed, and a peripheral area adjacent to the active area; and a digitizer disposed below the display module, wherein a first non-folding part and a second non-folding part, which are arranged in a first direction, and a folding part foldable along a folding axis extending in a second direction crossing the first direction and disposed between the first non-folding part and the second non-folding part are defined in the digitizer, and the digitizer comprises sensing coils disposed in the first non-folding part and the second non-folding part and connection lines disposed in the folding part and connected to the sensing coils, wherein the folding part comprises:

a central portion overlapping the active area and provided with first holes defined therethrough; and an outer portion overlapping the peripheral area and provided with second holes defined therethrough and third holes defined therethrough, wherein the second holes and the third holes are alternatively arranged in the first direction, each of the second holes has a shape different from a shape of each of the first holes, and each of the third holes has a shape different from the shape of each of the first holes and the shape of each of the second holes, wherein each of the first holes, the second holes and the third holes is defined completely through the folding part of the digitizer, wherein the connection lines disposed on the outer portion surround a portion of each of the second holes and third holes;

wherein the first holes comprise first group holes extending in the second direction and arranged in the second direction, and second group holes alternately arranged with the first group holes, shifted with respect to the first group holes in the second direction, extending in the second direction and arranged in the second direction, and each of the third holes is aligned with a corresponding one of the second group holes in the second direction.

2. The electronic apparatus of claim 1, wherein the sensing coils comprises first sensing coils and second sensing coils which are insulated from each other and each of which defines an open loop, and the digitizer further comprises:

a base layer which comprises a top surface facing the display module and a bottom surface opposing the top surface and on which the first sensing coils and the second sensing coils are disposed;

a first upper base layer disposed on the top surface of the base layer;

a second upper base layer disposed on a top surface of the first upper base layer;

a first lower base layer disposed on the bottom surface of the base layer; and a second lower base layer disposed on a bottom surface of the first lower base layer.

3. The electronic apparatus of claim 2, wherein each of the second holes comprises a first portion aligned with a corresponding one of the first group holes in the second direction and second and third portions spaced apart from each other in the first direction with the corresponding one of the first group holes therebetween and connected to the first portion, and each of the third holes is arranged on an edge of the outer portion in the first direction to define an opened opening.

4. The electronic apparatus of claim 3, wherein the connection lines comprise:

first upper lines disposed on the base layer;

second upper lines disposed on the first upper base layer;

first lower lines disposed below the base layer; and second lower lines disposed below the first lower base layer, wherein four coils are disposed between a second hole and a third hole, which are spaced apart from each other in the first direction, among the connection lines crossing the outer portion.

5. The electronic apparatus of claim 4, wherein the first upper lines and the first lower lines have shapes corresponding to each other in a plan view.

6. The electronic apparatus of claim 4, wherein the second upper lines comprises:

a first line comprising a first first portion which surrounds 'a' first portions adjacent to a boundary between the second non-folding part and the folding part and a first second portion connected to the first first portion and disposed between the first group hole and the second group hole, which are adjacent to each other in the first direction;

a second line comprising a second first portion which surrounds 'b' first portions adjacent to the boundary between the second non-folding part and the folding part and a second second portion connected to the second first portion, spaced apart from the first second portion in the first direction, and disposed between the first group hole and the second group hole, which are adjacent to each other in the first direction;

a third line comprising a third first portion which surrounds 'c' first portions adjacent to the boundary between the second non-folding part and the folding part and a third second portion connected to the third first portion, spaced apart from the second second portion in the first direction, and disposed between the first group hole and the second group hole, which are adjacent to each other in the first direction; and a fourth line comprising a fourth first portion which surrounds 'd' first portions adjacent to the boundary between the second non-folding part and the folding part and a fourth second portion connected to the fourth first portion, spaced apart from the third second portion in the first direction, and disposed between the first group hole and the second group hole, which are adjacent to each other in the first direction, wherein 'a', 'b', 'c', and 'd' are natural numbers, 'a' is less than 'b', 'b' is less than 'c', and 'c' is less than 'd'.

7. The electronic apparatus of claim 6, wherein the second lower lines comprises:

a fifth line comprising a fifth first portion which surrounds 'e' first portions adjacent to a boundary between the first non-folding part and the folding part and a fifth second portion connected to the fifth first portion and disposed between the first group hole and the second group hole, which are adjacent to each other in the first direction;

a sixth line comprising a sixth first portion which surrounds 'f' first portions adjacent to the boundary between the first non-folding part and the folding part and a sixth second portion connected to the sixth first portion, spaced apart from the fifth second portion in the first direction, and disposed between the first group hole and the second group hole, which are adjacent to each other in the first direction;

a seventh line comprising a seventh first portion which surrounds 'g' first portions adjacent to the boundary between the first non-folding part and the folding part and a seventh second portion connected to the seventh first portion, spaced apart from the sixth second portion in the first direction, and disposed between the first group hole and the second group hole, which are adjacent to each other in the first direction; and an eighth line comprising an eighth first portion which surrounds 'h' first portions adjacent to the boundary between the first non-folding part and the folding part and an eighth second portion connected to the eighth first portion, spaced apart from the seventh second portion in the first direction, and disposed between the first group hole and the second group hole, which are adjacent to each other in the first direction, wherein 'e', 'f', 'g', and 'h' are natural numbers, 'e' is less than 'f', 'f' is less than 'g', and 'g' is less than 'h'.

8. The electronic apparatus of claim 7, wherein, in a plan view, the first second portion, the second second portion, the third second portion, and the fourth second portion of the second upper lines are alternately arranged with the fifth second portion, the sixth second portion, the seventh second portion, and the eighth second portion of the second lower lines in the first direction.

9. The electronic apparatus of claim 3, wherein a pitch of a second hole and a third hole, which are adjacent to each other in the first direction, is greater than or equal to about 1.5 mm and less than or equal to about 2 mm, a distance between adjacent first portions of the first portions, which are aligned with the third hole in the second direction, in the first direction is greater than or equal to about 0.5 mm and less than or equal to about 0.7 mm, a width of the first portion in the first direction is greater than or equal to about 0.4 mm and less than or equal to about 0.6 mm, and a width of the third hole in the second direction is greater than or equal to about 2 mm and less than or equal to about 3 mm.

10. The electronic apparatus of claim 3, wherein a line width of each of the connection lines is greater than or equal to about 0.02 mm and less than or equal to about 0.05 mm, and a distance between adjacent connection lines among the connection lines is greater than or equal to about 0.02 mm and less than or equal to about 0.05 mm.

11. The electronic apparatus of claim 3, wherein a width of the outer portion in the second direction is greater than or equal to about 2 mm and less than or equal to about 5 mm.

12. The electronic apparatus of claim 2, wherein each of the second holes are aligned with the first group holes in the second direction and arranged on an edge of the outer portion to define an opened opening, each of the third holes are alternately arranged with the second holes in the first direction, and a portion of each of the first group holes aligned with the second holes in the second direction is disposed on the outer portion.

13. The electronic apparatus of claim 12, wherein the connection lines comprise:

first upper lines disposed on the base layer;

second upper lines disposed on the first upper base layer;

first lower lines disposed below the base layer; and second lower lines disposed below the first lower base layer, wherein each of the first upper lines, the second upper lines, the first lower lines, and the second lower lines comprises:

lower connection lines which surrounds an upper end of each of the first holes and a lower end of each of the third holes, which are disposed on the outer portion, among the first holes; and upper connection lines which crosses the upper end of each of the second holes and the third holes.

14. The electronic apparatus of claim 13, wherein the second upper lines and the second lower lines have shapes corresponding to each other in a plan view.

15. The electronic apparatus of claim 13, wherein the lower connection lines of the first upper lines comprise:

a first lower line comprising a first first portion which surrounds the lower end of each of 'a' third holes adjacent to a boundary between the second non-folding part and the folding part and a first second portion connected to the first first portion and disposed between the first group hole and the second group hole, which are adjacent to each other in the first direction; and a second lower line comprising a second first portion which surrounds the lower end of each of 'b' third holes adjacent to the boundary between the second non-folding part and the folding part and a second second portion connected to the second first portion, spaced apart from the first second portion in the first direction, and disposed between the first group hole and the second group hole, which are adjacent to each other in the first direction, wherein 'a' and 'b' are natural numbers, and 'a' is less than 'b'.

16. The electronic apparatus of claim 15, wherein the upper connection lines of the first upper lines comprise:

a first upper line comprising a third first portion which surrounds the upper end of each of the 'a' third holes adjacent to the boundary between the second non-folding part and the folding part and a third second portion connected to the third first portion, spaced apart from the second second portion in the first direction, and disposed between the first group hole and the second group hole, which are adjacent to each other in the first direction; and a second upper line comprising a fourth first portion which surrounds the upper end of each of the 'b' third holes adjacent to the boundary between the second non-folding part and the folding part and a fourth second portion connected to the fourth first portion, spaced apart from the third second portion in the first direction, and disposed between the first group hole and the second group hole, which are adjacent to each other in the first direction.

17. The electronic apparatus of claim 15, wherein the lower connection lines of the first upper lines comprise:

a third lower line comprising a third first portion which surrounds the upper end of each of 'c' third holes adjacent to a boundary between the first non-folding part and the folding part and a third second portion connected to the third first portion and disposed between the first group hole and the second group hole, which are adjacent to each other in the first direction; and a fourth lower line comprising a fourth first portion which surrounds the upper end of each of 'd' third holes adjacent to the boundary between the first non-folding part and the folding part and a fourth second portion connected to the fourth first portion, spaced apart from the third second portion in the first direction, and disposed between the first group hole and the second group hole, which are adjacent to each other in the first direction, wherein 'c' and 'd' are natural numbers, and 'c' is less than 'd'.

18. The electronic apparatus of claim 17, wherein the upper connection lines of the first lower lines comprise:

a third upper line comprising a fifth first portion which surrounds the lower end of each of 'c' third holes adjacent to the boundary between the first non-folding part and the folding part and a fifth second portion connected to the fifth first portion, spaced apart from the fourth second portion in the first direction, and disposed between the first group hole and the second group hole, which are adjacent to each other in the first direction; and a fourth upper line comprising a sixth first portion which surrounds the upper end of each of 'd' third holes adjacent to the boundary between the first non-folding part and the folding part and a sixth second portion connected to the sixth first portion, spaced apart from the fifth second portion in the first direction, and disposed between the first group hole and the second group hole, which are adjacent to each other in the first direction.

19. The electronic apparatus of claim 12, wherein a pitch of the third holes in the first direction is greater than or equal to about 0.6 mm and less than or equal to about 1.0 mm, a width of each of the third holes in the first direction is greater than or equal to about 0.1 mm and less than or equal to about 0.2 mm, and a width of each of the third holes in the second direction is greater than or equal to about 1.6 mm and less than or equal to about 2.5 mm.

20. The electronic apparatus of claim 12, wherein a distance between the first group hole and the third group hole, which are disposed on the outer portion in the first direction, is greater than or equal to about 0.15 mm and less than or equal to about 0.3 mm, and a distance between the first group hole and the second group hole, which are disposed on the outer portion in the second direction, is greater than or equal to about 0.3 mm and less than or equal to about 0.5 mm.

21. The electronic apparatus of claim 2, wherein each of the base layer, the first upper base layer, the second upper base layer, the first lower base layer, and the second lower base layer comprises a reinforced fiber composite material.

22. The electronic apparatus of claim 2, wherein the base layer comprises polyimide, and each of the base layer, the first upper base layer, the second upper base layer, the first lower base layer, and the second lower base layer comprises a reinforced fiber composite material.

23. The electronic apparatus of claim 2, wherein each of the base layer, the first upper base layer, and the first lower base layer comprises polyimide, and each of the second upper base layer and the second lower base layer comprises a reinforced fiber composite material.

24. The electronic apparatus of claim 1, wherein the sensing coils comprises first sensing coils and second sensing coils which are insulated from each other and each of which defines an open loop, and the digitizer further comprises:

contact holes defined in the outer portion and adjacent to an edge of the outer portion;

a base layer which comprises a top surface facing the display module and a bottom surface opposing the top surface and on which the first sensing coils and the second sensing coils are disposed;

a first upper base layer disposed on the top surface of the base layer;

a second upper base layer disposed on a top surface of the first upper base layer; and a lower base layer disposed on the bottom surface of the base layer.

25. The electronic apparatus of claim 24, wherein each of the second holes are aligned with the first group holes in the second direction and arranged on an edge of the outer portion to define an opened opening, each of the third holes are alternately arranged with the second holes in the first direction, and a portion of each of the first group holes aligned with the second holes in the second direction is disposed on the outer portion.

26. The electronic apparatus of claim 25, wherein the connection lines comprise:

first upper lines disposed on the base layer;

second upper lines disposed on the first upper base layer; and lower lines disposed below the base layer, wherein each of the first upper lines and the second upper lines comprises:

lower connection lines crossing an upper end of each of the first holes and a lower end of each of the third holes, which are defined in the outer portion, among the first holes; and upper connection lines crossing an upper end of each of the second holes and the third holes, wherein the lower lines are arranged to be spaced apart from each other in the first direction, and each of the lower lines is connected to a corresponding one of the contact hole correspondingly extending in the second direction.

27. The electronic apparatus of claim 26, wherein the first upper lines and the second upper lines are connected to corresponding lower lines among the lower lines through the contact holes.

28. The electronic apparatus of claim 1, wherein the digitizer senses an external input in an electro magnetic resonance manner.

29. The electronic apparatus of claim 1, wherein a width of the outer portion in the second direction is greater than or equal to about 2 mm and less than or equal to about 4 mm.

30. The electronic apparatus of claim 1, wherein the display module comprises:

a display panel which displays the image; and an input sensor disposed on the display panel to sense an external input in a capacitive manner.

\*　\*　\*　\*　\*